(12) United States Patent
Balko

(10) Patent No.: US 8,918,793 B2
(45) Date of Patent: Dec. 23, 2014

(54) RESOLVING RESOURCE CONTENTIONS

(75) Inventor: Soeren Balko, Weinheim (DE)

(73) Assignee: SAP SE, Walldorf (DE)

( * ) Notice: Subject to any disclaimer, the term of this patent is extended or adjusted under 35 U.S.C. 154(b) by 401 days.

(21) Appl. No.: 13/313,421

(22) Filed: Dec. 7, 2011

(65) Prior Publication Data
US 2013/0152090 A1  Jun. 13, 2013

(51) Int. Cl.
*G06F 9/46* (2006.01)
*G06F 9/44* (2006.01)

(52) U.S. Cl.
USPC .......................... 718/104; 718/102; 717/104

(58) Field of Classification Search
None
See application file for complete search history.

(56) References Cited

U.S. PATENT DOCUMENTS

| | | | |
|---|---|---|---|
| 6,052,684 A * | 4/2000 | Du | 1/1 |
| 7,647,577 B2 * | 1/2010 | Wang et al. | 717/105 |
| 2004/0015833 A1 * | 1/2004 | Dellarocas et al. | 717/106 |
| 2005/0283786 A1 * | 12/2005 | Dettinger et al. | 718/104 |
| 2006/0004863 A1 * | 1/2006 | Chan et al. | 707/104.1 |
| 2006/0206855 A1 * | 9/2006 | Nair et al. | 717/100 |
| 2007/0203745 A1 * | 8/2007 | Bartsch et al. | 705/2 |
| 2007/0265895 A1 | 11/2007 | Moore | |
| 2009/0012829 A1 * | 1/2009 | Tian et al. | 705/7 |
| 2009/0150860 A1 * | 6/2009 | Gschwind et al. | 717/104 |
| 2009/0235252 A1 * | 9/2009 | Weber et al. | 718/100 |
| 2010/0131916 A1 | 5/2010 | Prigge | |
| 2011/0078426 A1 * | 3/2011 | Stoitsev | 712/244 |
| 2011/0078650 A1 * | 3/2011 | Weber et al. | 717/104 |
| 2011/0161284 A1 * | 6/2011 | Tewari et al. | 707/609 |
| 2012/0016713 A1 * | 1/2012 | Wilcock et al. | 705/7.27 |
| 2012/0227047 A1 * | 9/2012 | Aharoni et al. | 718/102 |
| 2013/0073334 A1 * | 3/2013 | Favre et al. | 705/7.27 |

* cited by examiner

*Primary Examiner* — Abdullah Al Kawsar
(74) *Attorney, Agent, or Firm* — Fish & Richardson P.C.

(57) ABSTRACT

A computer-implemented method for managing access to a shared resource of a process may include identifying a plurality of process steps, each process step of the plurality of process steps, when executed, accessing the shared resource at a same time. The method may also include rearranging at least one of the process steps of the plurality of process steps to access the shared resource at a different time.

24 Claims, 16 Drawing Sheets

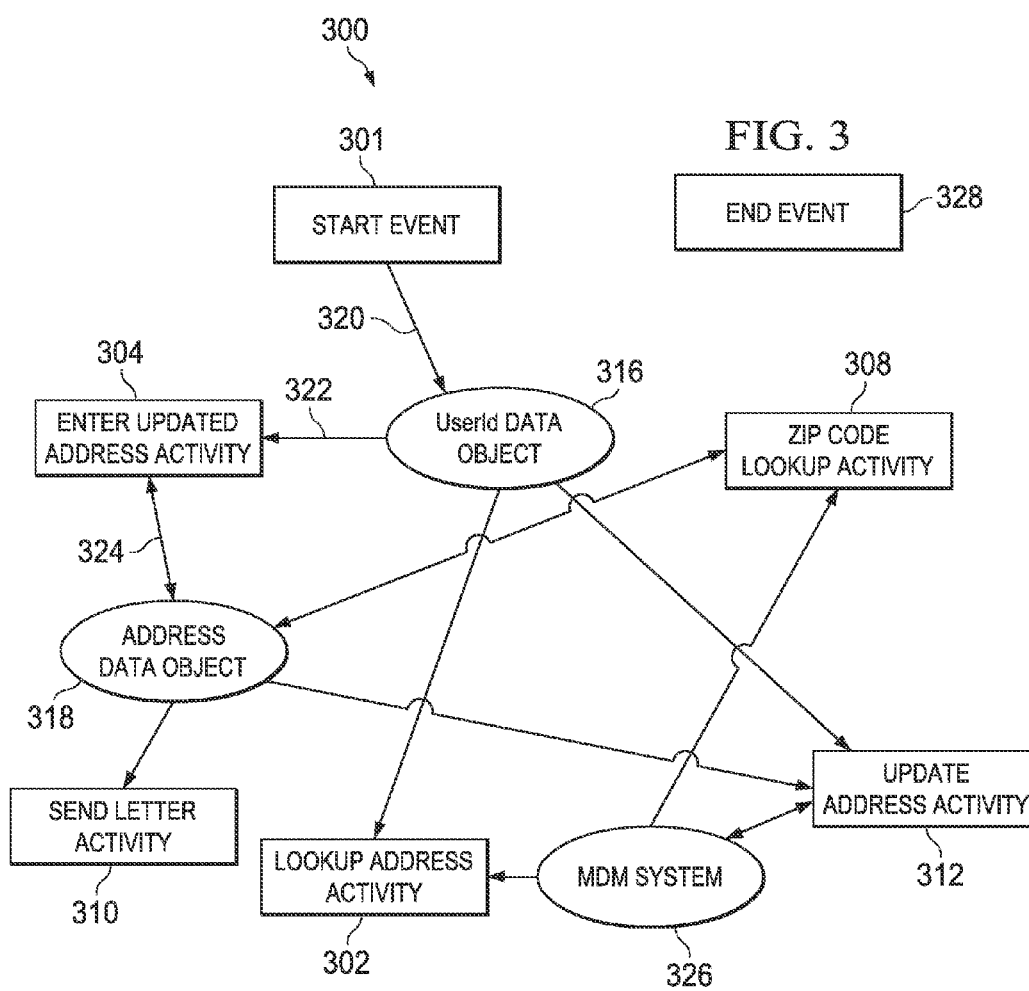

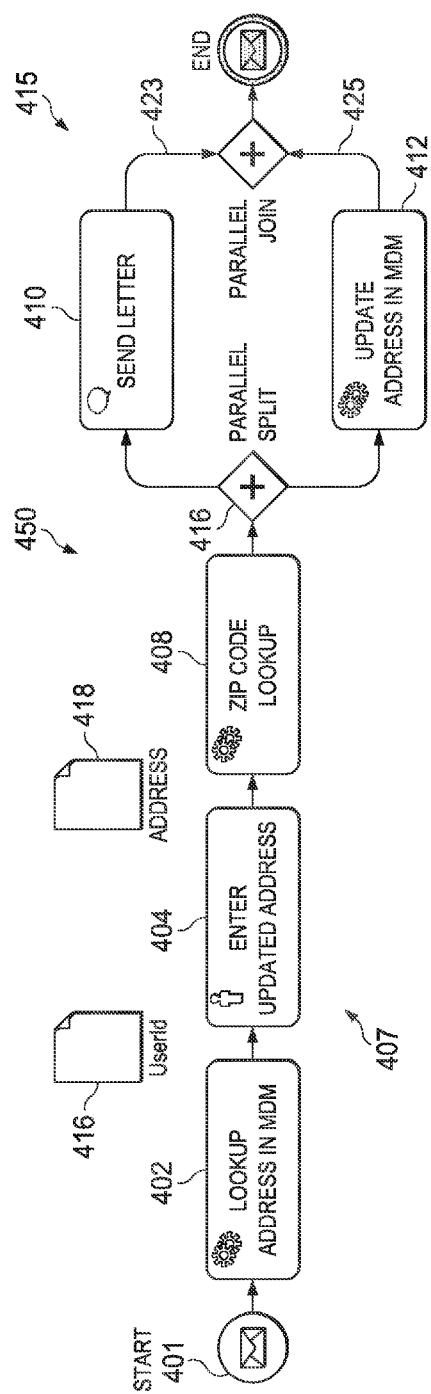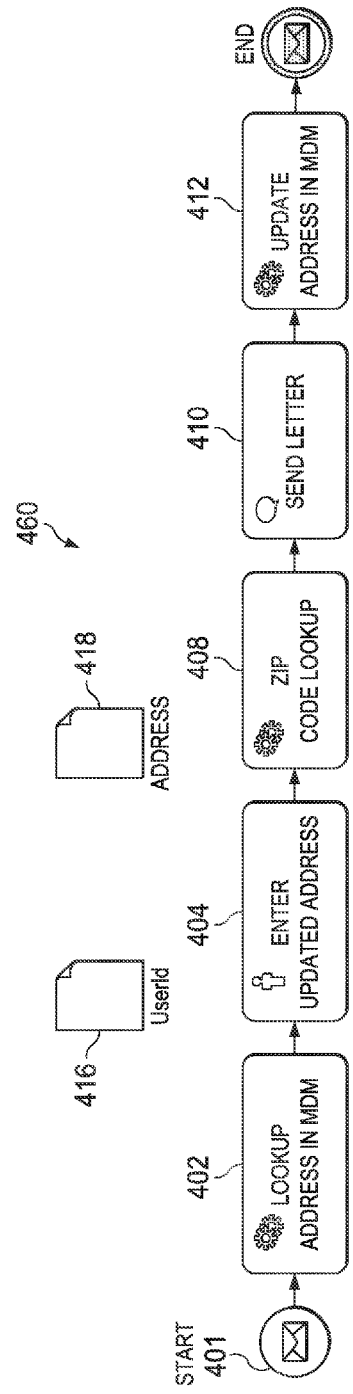
FIG. 4B
FIG. 4C

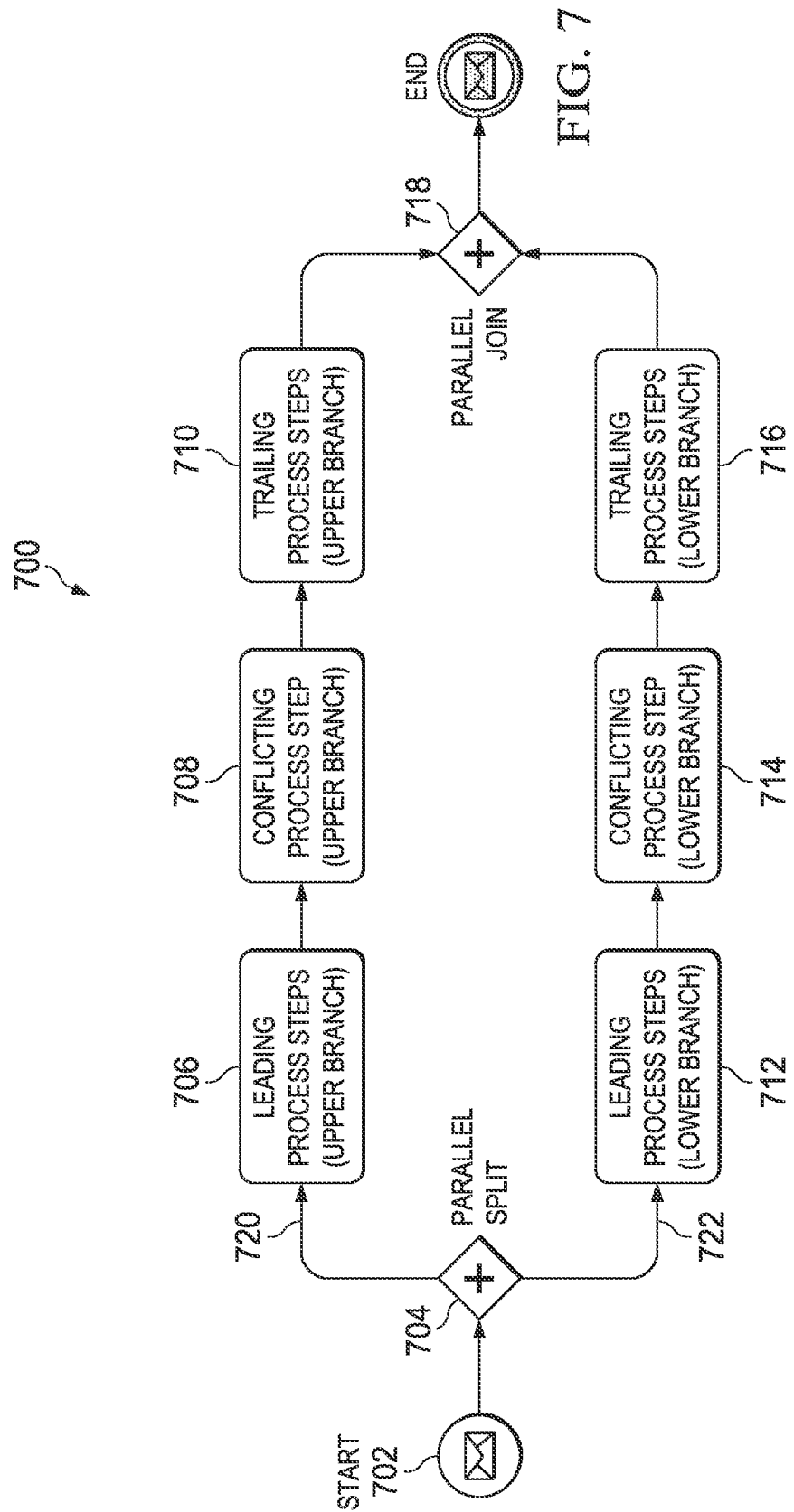

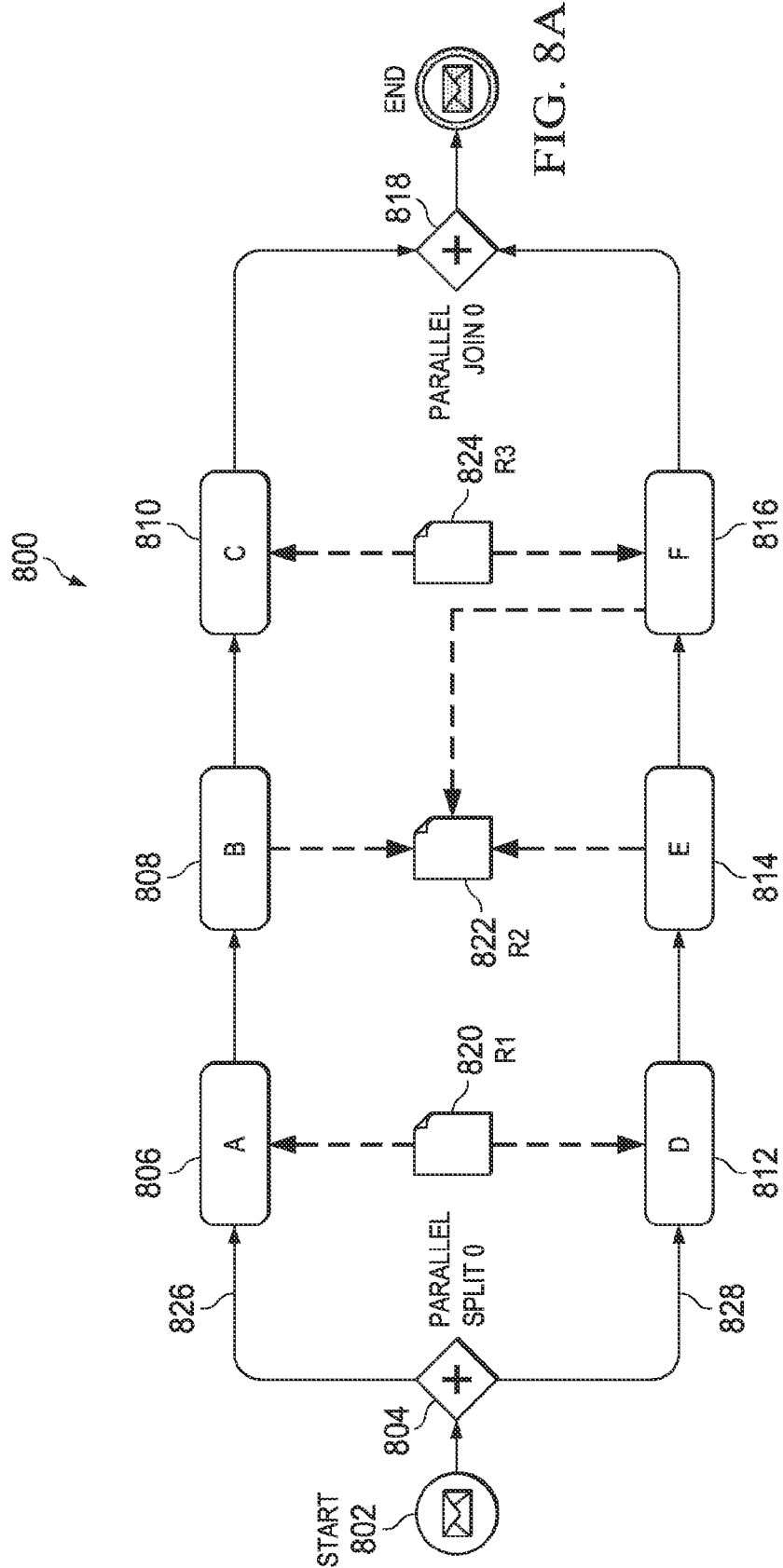

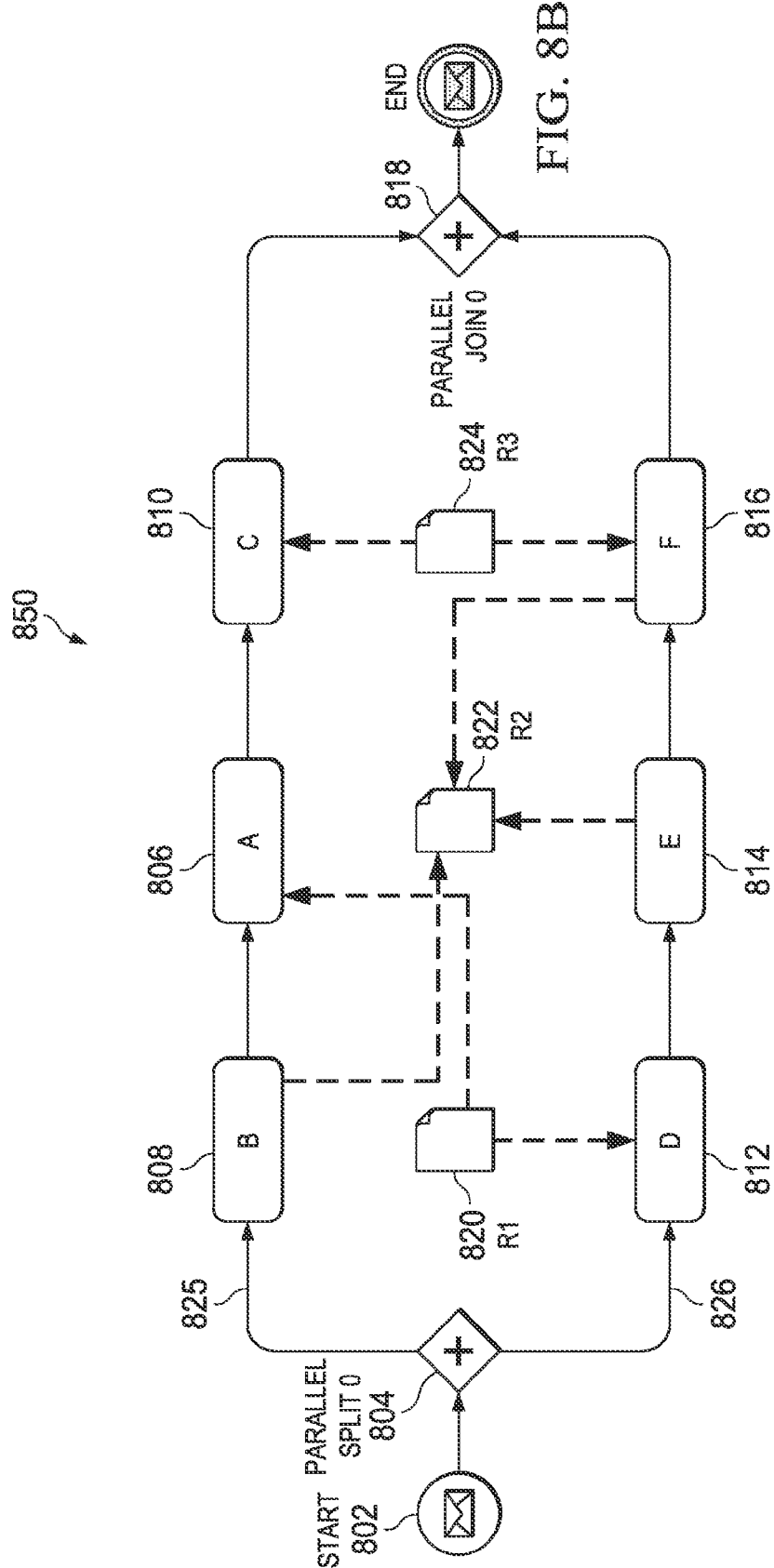

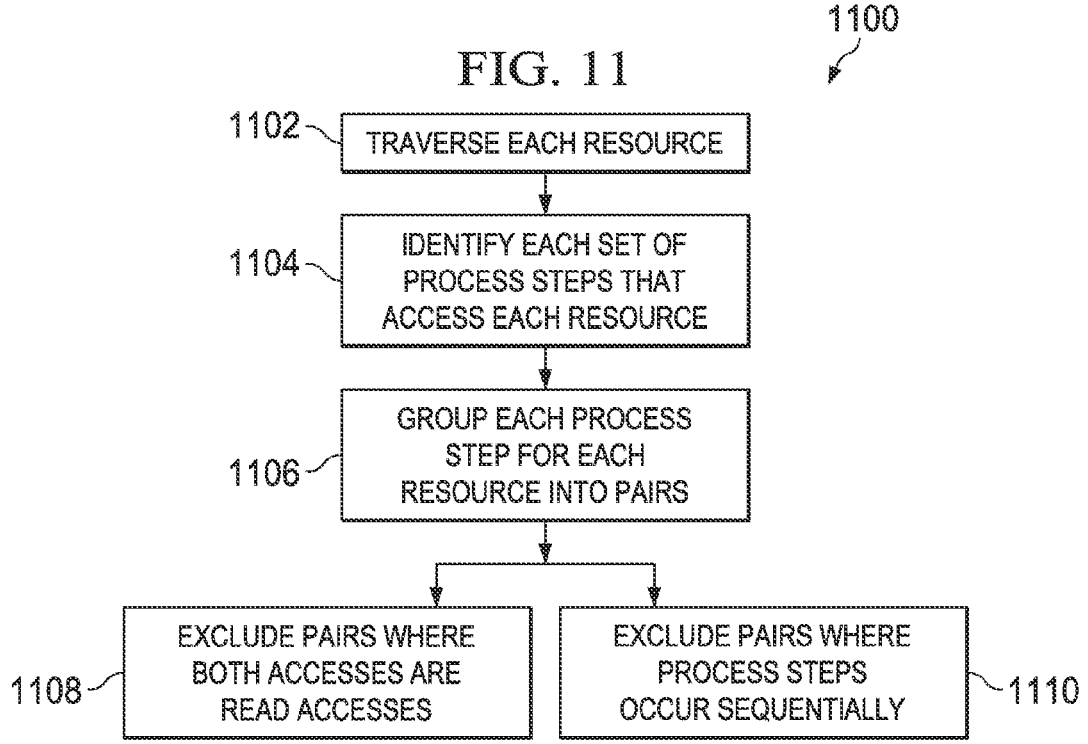

RESOLVING RESOURCE CONTENTIONS

TECHNICAL FIELD

This disclosure relates to resolving resource contentions and, more particularly, to resolving resource contentions in process modeling.

BACKGROUND

Process modeling may result in resource contentions and race conditions based on conflicting accesses to shared resources. Complex processes often suffer from resource contentions, which include simultaneous accesses to shared resources from multiple process steps. Concurrent modifications of shared resources from parallel process branches may also lead to race conditions such as lost update phenomena, which includes a scenario in which concurrent process steps update the same resource, where one process step overwrites the effects of the other process step.

SUMMARY

Embodiments of the disclosed subject matter include a computer implemented method for managing access to a shared resource of a process may include identifying a plurality of process steps, each process step of the plurality of process steps, when executed, accessing the shared resource at a same time. The method may also include rearranging at least one of the process steps of the plurality of process steps to access the shared resource at a different time.

A system for resolving conflicting resource accesses by process steps in a process model. The system may include a memory for storing instructions and at least one processor. The processor may be configured to execute the instructions stored on the memory. In some embodiments, the instructions operable when executed to identify a plurality of process steps that are executed in parallel, each process step of the plurality of process steps accessing, when executed, a shared resource at the same time. The instructions may also include rearranging at least one of the process steps of the plurality of process steps to access the shared resource at a different time to create a new process model. The new process model can be stored in the memory.

A computer program product may be stored on a tangible, non-transitory media, and may be operable when executed to identify a plurality of process steps that are executed in parallel, each process step of the plurality of process steps accessing, when executed, a shared resource at the same time. The computer program product may also be operable when executed to rearrange at least one of the process steps of the plurality of process steps to access the shared resource at a different time to create a new process model. The new process model may be stored in a memory.

In certain implementations of the embodiments, at least one process step of the plurality of process steps performs a write access to the shared resource. In certain implementations of the embodiments, at least one of the process steps of the plurality of process steps performs an update to the shared resource.

In certain implementations of the embodiments, each processing step of the plurality of processing steps may be executed on corresponding parallel branches of the process. Rearranging at least one of the process steps to access the shared resource at a different time may include moving the at least one process step to a position outside of the corresponding parallel branch of the process. In certain instances, the position outside of the parallel branches of the process is a position prior to the start of the parallel branches of the process. In certain instances, rearranging at least one of the process steps to access the shared resource at a different time may include changing an order of process steps of at least one of the branches of the parallel branches of the process.

In certain implementations of the embodiments, a dependency graph relating one or more resources used during the process and the plurality of process steps may be generated. The resources and each process step of the plurality process steps may be nodes of the dependency graph, and each edge of the dependency graph may represent an access of the resource by the process step. In certain instances, one or more conflicting accesses to the resource from two or more process steps can be identified based on the dependency graph. In certain instances, the one or more conflicting accesses to the resource include at least one write access to the resource. In certain instances, the two or more process steps may be executed on parallel branches of the process concurrently.

In certain instances, identifying the one or more conflicting accesses may include identifying the resource in the dependency graph. The plurality of process steps that access the resource may be identified. The plurality of process steps may be grouped into distinct pairs. Pairs of process steps can be identified wherein both accesses to the resource by the process steps are read accesses. Pairs of process steps, wherein both accesses to the resource by the process steps are read accesses, can be excluded. In certain instances, pairs of process steps that are identified to execute sequentially are excluded.

In certain implementations of the embodiments, the resource may be one or both of an explicit resource that is intrinsic to the process, or an implicit resource that is extrinsic to the process.

In certain implementations of the embodiments, the plurality of process steps are performed on corresponding parallel branches of the process. At least one of the process steps of the plurality of process steps can be rearranged to access the shared resource at a different time includes transforming the corresponding parallel branches into sequential branches.

In certain implementations of the embodiments, the plurality of process steps may include a first conflicting process step performed on a corresponding first parallel branch of the process and a second conflicting process step performed on a corresponding second parallel branch of the process. For each conflicting process step, there may be on each corresponding parallel branch, at least one previous process step and at least one subsequent process step.

In certain implementations of the embodiments, rearranging at least one of the process steps of the plurality of process steps to access the shared resource at a different time may include identifying a first value for the previous process step on a first branch of the parallel branches of the process. A first value in a first data object can be stored. A second value for the previous process step on a second branch of the parallel branches of the process may be identified. The second value in a second data object can be stored. One of the first or second conflicting process steps based on the value in the data object can be executed.

The details of one or more embodiments of the disclosure are set forth in the accompanying drawings and the description below. Other features, objects, and advantages described in this disclosure will be apparent from the description and drawings, and from the claims.

DESCRIPTION OF DRAWINGS

FIG. 3 is an example dependency graph of the example process model shown in FIG. 2.

FIG. 4B is an example process model having a process construction that resolves the resource contention identified in FIG. 4A.

FIG. 4C is an example process model having a process construction that resolves the resource contention identified in FIG. 4A.

FIG. 7 is a process showing an example Second Case process model.

FIG. 8A is a process showing an example abstraction of the Second Case process model of FIG. 7.

FIG. 8B is a process showing an example Second Case process model in which conflicting accesses are resolved by swapping process step sequences.

FIG. 11 is a process flow chart for identifying conflicting resource accesses by process steps executed in parallel.

Like reference symbols in the various drawings indicate like elements.

DETAILED DESCRIPTION

Business Process Model Notation (BPMN) facilitates the concurrent execution of process steps by splitting the control flow into parallel branches. The BPMN standard provides for "Inclusive Gateways" (also referred to as "OR" split/join), "Parallel Gateways" (also referred to as "AND" split/join), and "Complex Gateways," each of which facilitate the forking (or branching) and/or synchronization of concurrent threads of control simultaneously executing process steps on separate branches. Concurrency can improve process turnaround times by making progress on multiple process steps in parallel. Concurrency may lead to resource contentions (i.e., conflicting accesses to an exclusive resource happening in parallel), which adversely affect performance due to concurrency control mechanisms, such as delayed lock acquisition (i.e., having to wait for a lock until it is freed up by another thread) or repetitive transaction rollbacks/retries (i.e., having to abort and re-schedule a transaction that failed to acquire a lock after waiting some time). Using locks to implement a concurrency control mechanism does not exclude alternative means to accomplish the same, such as optimistic measures (like timestamp ordering) which suffer from the same problems. Concurrent modifications of shared resources from parallel process branches may lead to race conditions, such as lost update phenomena (i.e., concurrent process steps that update the same resource where one process step overwrites the effects of the other process step).

Sequentializing resource contentions may address resource contentions and race conditions. Sequentializing resource contentions include, in general, (1) identifying process steps on parallel branches performing conflicting accesses to shared resources. This concept considers both (1a) explicit conflicts, such as concurrent data context accesses, and (1b) implicit conflicts, such as external service invocations. Sequentializing also includes, in general, (2) rearranging those process steps in an intent-preserving manner such that the conflict is resolved. This concept can include (2a) changing the order of process steps on a branch, and/or (2b) moving process steps out of (i.e., front of or behind) the parallel branches.

Figure 1:
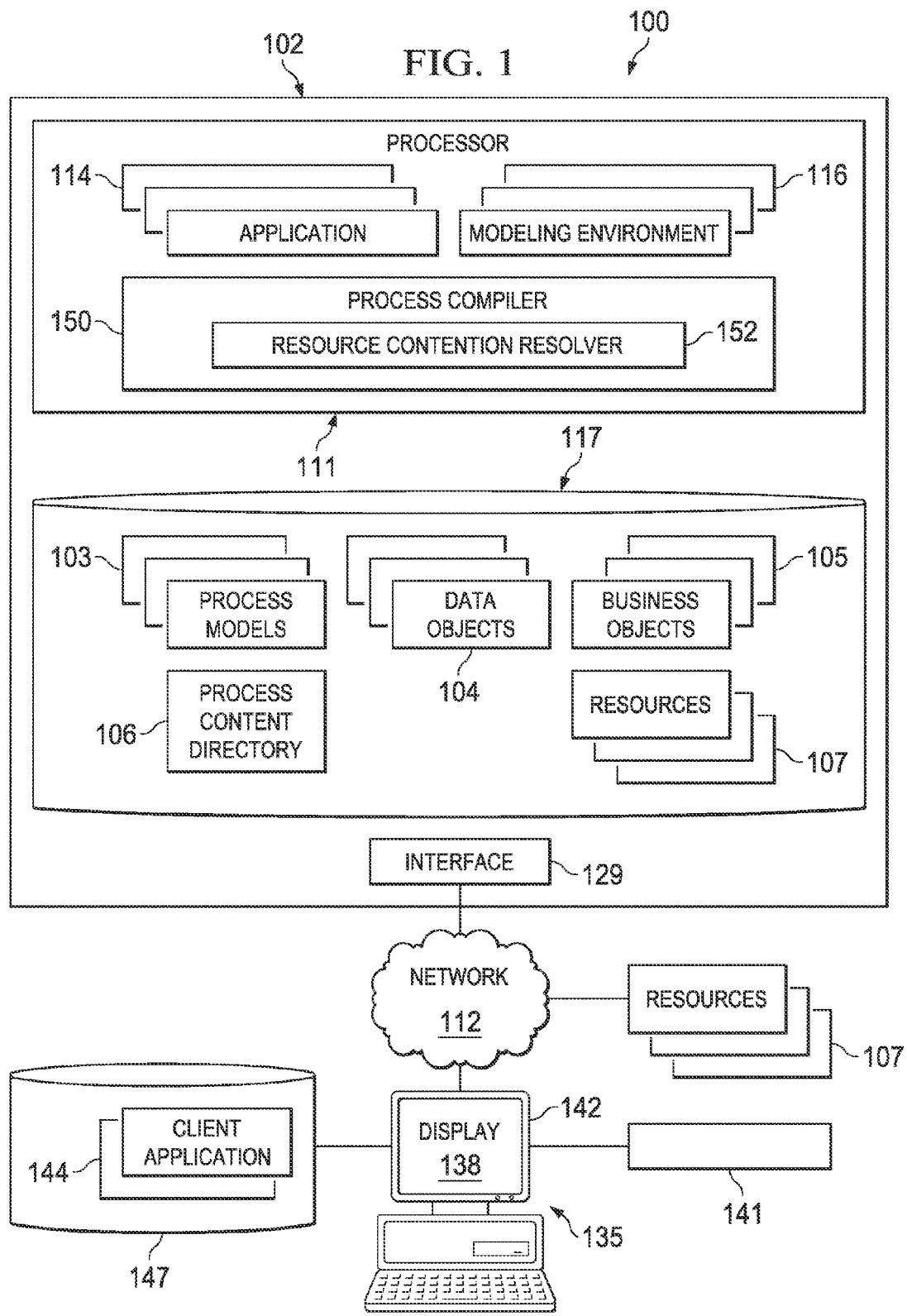
FIG. 1 is a schematic illustration of a system for resolving resource contentions.

FIG. 1 is a schematic illustration of a system for resolving resource contentions. The illustrated environment 100 includes, or is communicably coupled with, server 102 and one or more clients 135, at least some of which communicate across network 112. In general, environment 100 depicts an example configuration of a system capable of resolving resource contentions and/or race conditions that may occur during execution of processes.

In general, the server 102 is any server that stores one or more hosted applications 114, where at least a portion of the hosted applications 114 are executed via requests and responses sent to users or clients 135 within and communicably coupled to the illustrated environment 100 of FIG. 1. In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 112 by the clients 135 of the system to perform the programmed tasks or operations of the hosted application 114. Hosted application 114 may be a hosted process modeling environment or may be a process execution environment in which processes modeled by client 135 are executed. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144. In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

Generally, the network 112 facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance, at least a portion of the network 112 may represent a connection to the Internet. In some instances, a portion of the network 112 may be a virtual private network (VPN), such as, for example, the connection between the client 135 and the server 102. Further, all or a portion of the network 112 can include either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations.

As shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 112 (e.g., client 135, as well as other systems communicably coupled to the network 112). Generally, the interface 129 includes logic encoded in software and/or hardware in a suitable combination and operable to communicate with the network 112. More specifically, the interface 129 may include software supporting one or more communication protocols associated with communications such that the network 112 or interface's hardware is operable to communicate physical signals within and outside the illustrated environment 100.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the client(s) 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Environment 100 includes a process compiler 150 and a resource contention resolver 152 that transforms process models (like BPMN diagrams or other process models 103) into an executable format (e.g., JAVA® Enterprise Edition (JEE) applications). As part of that transformation, detected resource contentions are identified, and if possible resolved, to improve the process's runtime behavior. Resolving resource contentions occurs prior to process execution at runtime.

In the illustrated environment 100, processor 111 executes one or more hosted applications 114 on the server 102. At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 114 may represent web-based applications accessed and executed by remote clients 135 or client applications 144 via the network 112 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

Hosted application 114 may execute processes modeled by client 135. Similarly, hosted application 114 may be a modeling environment through which client 135 models processes. For example, hosted application 114 may access a memory 117 that stores process models 103, data objects 104, business objects 105, process content directory 106, and resources 107.

Resources 107 include implicit and explicit resources, such as concurrent data context accesses and external service invocations, respectively. More specifically, an explicit (internal) resource includes a resource that is exclusively owned by the process (i.e., its lifecycle is managed by the business process management system (BPMS) runtime) and whose "uses" (i.e., updates [writes] and consumption [reads]) can be looked up from the process model. External components that wish to access the internal resource may use BPMS Application Programming Interfaces (APIs) to do so (e.g., to alter the process context from some administration user interface (UI)). Example explicit resources include, though are not limited to, data objects from the process context that are accessed in data mappings, gateway conditions, and correlation conditions; and events (signals, errors, escalations, messages, etc.) that are produced and consumed by various flavors of Throw Events and Catch Events, respectively.

Implicit (external) resources include a non-process resource (e.g., the state in some external business application) that is external to the process. The way an implicit resource is generally used is not information exhaustively stored in the process model (i.e., external applications may "bypass" the process and directly alter the resource). The process model itself may "obfuscate" its use of the resource such that the optimization algorithm needs to apply heuristics to both narrow down what is a separate resource and how it is used (updated and consumed) from the process. Example implicit resources include, but are not limited to, business systems that are identified by joint hosts from endpoint Uniform Resource Locators (URL) of service calls (depending on the message exchange pattern, read accesses can be assumed for (stateless) synchronous calls and write accesses for (stateful) asynchronous calls); and business entities, such as business objects, or applications, that are identified by the service signature (e.g., Simple Object Access Protocol (SOAP): portType and operation name; REST: endpoint URL). For Representational State Transfer (REST)-based calls, the HyperText Transfer Protocol (HTTP) protocol "verbs" (GET, POST, PUT, DELETE, etc.) may be used to infer a read or write access.

In general, the overall structure of the process model 103 ensures the consistency of the interfaces that are derived from the process model 103. The derivation helps ensure that the same business-related subject matter or concept can be represented and structured in the same way in various interfaces. The process model 103 defines the business-related concepts at a central location for a number of business transactions. In other words, it reflects the decisions made about modeling the business entities of the real world acting in business transactions across industries and business areas. For ABAP applications, the process model 103 is defined by the business objects 105 and their relationship to each other (the overall net structure). For BPMN-based processes, the process model 103 is a control flow graph that orchestrates process steps (activities, events, gateways, etc.) that may perform tasks such as user interactions, service calls, manipulating data objects, etc. A "business object" is an entity outside of a process that is typically accessed through services. As such, it may be considered an implicit resource.

Each business object 105 is thus a capsule with an internal hierarchical structure, behavior offered by its operations, and integrity constraints. Business objects 105 are generally semantically disjointed, i.e., the same business information is represented once. In some embodiments, the business objects 105 are arranged in an ordering framework such that they can be arranged according to their existence dependency to each other. For example, in a modeling environment, the customizing elements might be arranged on the left side of the process model 103, the strategic elements might be arranged in the center of the process model 103, and the operative elements might be arranged on the right side of the process model 103. Similarly, the business objects 105 can be arranged in this model from the top to the bottom based on defined order of the business areas, e.g., finance could be arranged at the top of the business object model with customer relationship management (CRM) below finance, and supplier relationship management (SRM) below CRM. To help ensure the consistency of interfaces, the business object model may be built using standardized data types, as well as packages, to group related elements together, and package templates and entity templates to specify the arrangement of packages and entities within the structure.

A business object may be defined such that it contains multiple layers, such as in the example business object 105. The example business object 105 contains four layers: the kernel layer, the integrity layer, the interface layer, and the access layer. The innermost layer of the example business object 105 is the kernel layer. The kernel layer represents the business object's 105 inherent data, containing various attributes of the defined business object 105. The second layer represents the integrity layer. In the example business object 105, the integrity layer contains the business logic of the object. Such logic may include business rules for consistent embedding in the environment 100 and the constraints regarding the values and domains that apply to the business object 105. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 105. The third layer, the interface layer, may supply the valid options for accessing the business object 105 and describe the implementation, structure, and interface of the business object 105 to the outside world. To do so, the interface layer may contain methods, input event controls, and output events. The fourth and outermost layer of the business object 105 in is the access layer. The access layer defines the technologies that may be used for external access to the business object's 105 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 105 of this embodiment may implement object-oriented technologies such as encapsulation, inheritance, and/or polymorphism.

Some or all of the data objects 105, process models 103, and information associated with or stored in the process content directory 106 may be stored or referenced in a local or remote memory 117, which can be a development or metamodel repository. This memory 117 may include parameters, pointers, variables, algorithms, instructions, rules, files, links, or other data for easily providing information associated with or to facilitate modeling of the particular object. More specifically, each memory 117 may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each repository may include one table or file or a plurality of tables or files stored on one computer or across a plurality of computers in any appropriate format as described above. Indeed, some or all of the particular repository may be local or remote without departing from the scope of this disclosure and store any type of appropriate data.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. Additionally, memory 117 may include any other appropriate data, such as VPN applications, firmware logs and policies, firewall policies, a security or access log, print or other reporting files, as well as others.

Memory 117, whether local or distributed, can also store a process content directory 106. The process content directory 106 can store detailed relationship and connection information defined between the models and entities designed in the modeling environment 116, as well as provide the data and other information needed to allow for the automated addition of model-related and model-defining information into high-level models created by business users and technical developers. For example, the process content directory 106 may store detailed information regarding additional and/or more detailed connections defined for the high-level elements created or modeled in the modeling environment 116. The process content directory 106 can store information used to define previously-generated models, including the connections and operations included in and associated with various modeled entities. Therefore, the information stored in the process content directory 106 can be used for the automatic generation of later-developed or updated models when one or more elements added to a particular model have previously been used or modeled in earlier-defined models. Additionally, changes to one or more of the models associated with the process content directory 106 can be reflected in the data stored therein. Process models 103 defined or generated using information from the process content directory 106 can be automatically updated by reloading or re-analyzing the modified information stored within the directories.

In some instances, the process content directory 106 can store information defining which entities are available for a particular process, business area, or work center, among others. For instance, where a particular component has already been defined in the modeling environment 116, information stored in the process content directory 106 can be used to describe a set of entities to which that particular component can navigate to or be associated with. Using information retrieved from the process content directory 106, a model describing the navigation available from a particular component can be at least partially generated or described.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135, each client 135 includes a processor 141, an interface 142, a graphical user interface (GUI) 138, a client application 144, and a memory 147. In general, each client 135 includes an electronic computer device operable to receive, transmit, process, and store any appropriate data associated with the environment 100 of FIG. 1. It will be understood that there may be any number of clients 135 associated with, or external to, environment 100, even though environment 100 shows a single client. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 comprising a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user. In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. The GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
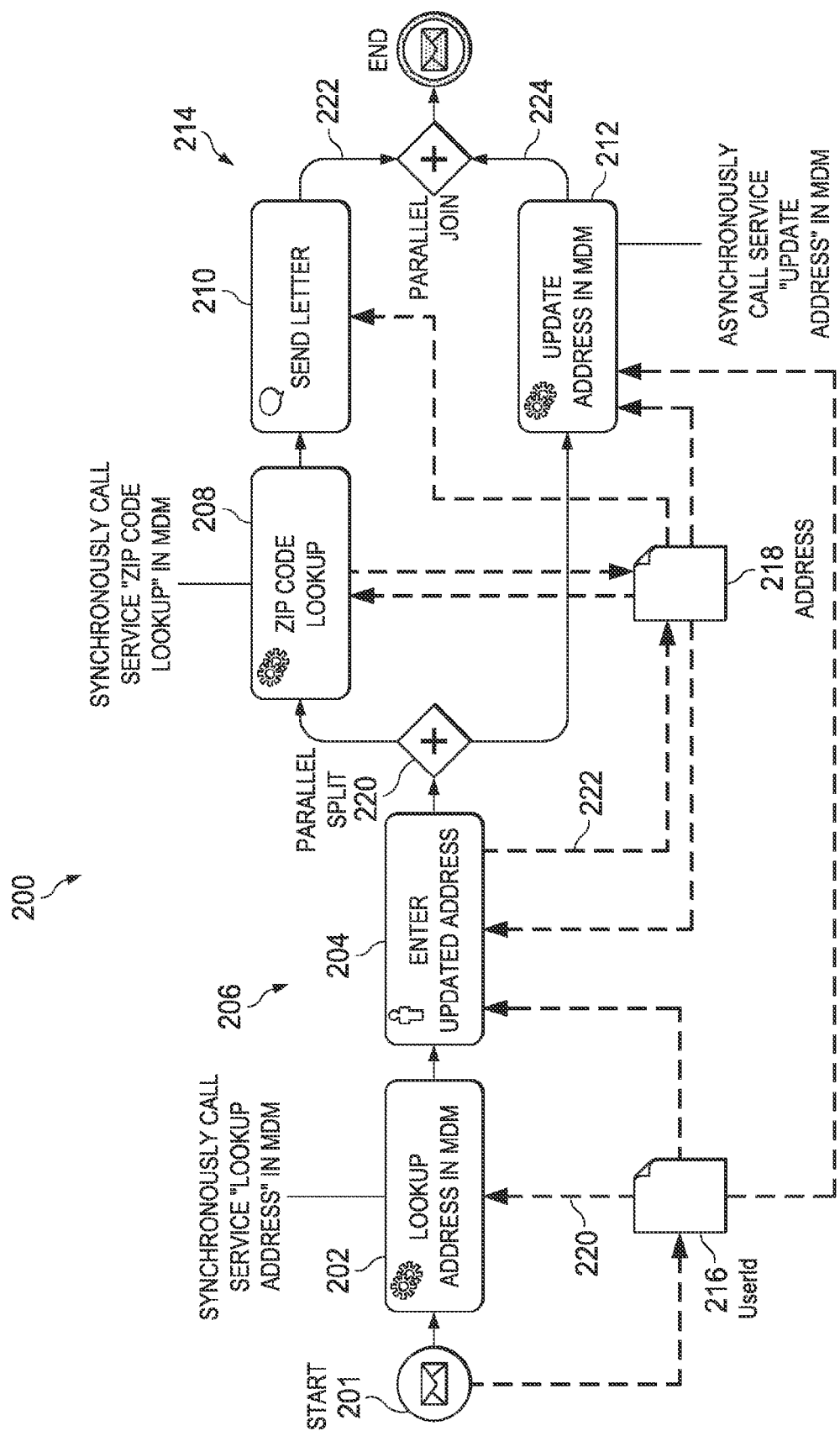
FIG. 2 is an example schematic of a process model illustrating serial and parallel processes and corresponding access to resources.

FIG. 2 is an example schematic of a process model 200 illustrating serial and parallel processes and corresponding access to resources. Process model 200 implements a simple mail sending application which (1) looks up the address for a given user ID from a master data management (MDM) system, (2) lets the user manually update that address, (3) stores the updated address in the lower branch back into the MDM system, (4) fetches the associated postal code (aka "ZIP code") for the address and (5) sends the letter to the recipient using the address. Explicit dependencies are shown as data flow edges to the "UserId" data object 216 and "Address" data object 218, where the arrow direction indicates a read access from the data object and write access to the data object, respectively. For example, edge 220 depicts a read access by "Lookup Address in MDM" activity 202 of UserID data object 216. Edge 222 depicts a write access to Address data object 218 by "Enter Updated Address" activity 204. Implicit dependencies result from service invocations in the underlying Master Data Management (MDM) system happening in activities "Lookup Address in MDM" 202, "ZIP code lookup" 208, and "Update address in MDM" 212. The algorithm uses heuristics that consult the message exchange pattern of those services to derive the type of dependency. That is, the "Lookup Address in MDM" activity 202 and "ZIP code lookup" activity 208 both perform synchronous invocations which translate to a read-only access, whereas "Update Address in MDM" activity 212 is an asynchronous call that corresponds to a write access. The implicit resource that is shared among the aforementioned services may be derived. For the sake of simplicity, the algorithm may simply consider the entire target system (here: some MDM system in the IT landscape) as a single resource. A more fine-granular breakdown of implicit resources might consider each service (e.g., the Web Service Definition Language (WSDL) portType for SOAP-based services and the host-port-path portion of the service endpoint URL for REST-based services) as a separate resource that is exclusively accessed through the operations of that service. Other metadata, such as Business Objects from SAP ES Workplace, might be considered to further narrow down the granularity of external process resources.

Process model 200 includes six activities. (Each artifact (start event, end event, AND split, AND merge gateway plus the five activities) is a process step, so the term "activities" is used to distinguish.) At the start 201, a user ID may be accessed to access the user profile for sending mail. Activity 202 is the "Lookup Address in MDM" step, which reads from UserID data object 216 and performs a synchronous call to lookup address in MDM. The process model then permits the user to manually enter an updated address in the "Enter Updated Address" activity 204. The "Enter Updated Address" activity 204 performs a read from User ID data object 216 and from the Address data object 218. If the address is updated, the "Enter Updated Address" activity 204 performs a write access (or an update access) to the Address data object 218. "Lookup Address in MDM" activity 202 and "Enter Updated Address" activity 204 are shown to be performed in sequence (or in series) on a "sequential branch" 206 of the process model 200.

After the "Enter Updated Address" activity 204, the process splits into two parallel branches. The two parallel branches can be described as being part of a set of parallel branches 214. In this case, the set of parallel branches 214 includes two parallel branches. In FIG. 2, the sequential branch 206 forks into the set of parallel branches 214 by a parallel split 220, which is also referred to as "AND" split because process steps from both branches of the set of parallel branches 214 are executed. The "upper branch" 222 of the set of parallel branches 214 includes two process steps: "ZIP Code Lookup" 208 and "Send Letter" 210. The "lower branch" 224 includes one process step: "Update Address in MDM" 212. In this particular scenario, "ZIP Code Lookup" 208 is in conflict with "Update Address in MDM" 212 because the two process steps occur in parallel, the two process steps access the same resource, and at least one of the two process steps performs a write access on the resource (in this case, "Update Address in MDM" 212 writes to the Address data object 218). Such a conflict can result in a resource contention.

Sequentializing resource contentions may address resource contentions and race conditions. Sequentializing resource contentions includes, in general, (1) identifying process steps on parallel branches performing conflicting accesses to shared resources. This concept considers both (1a) explicit conflicts, such as concurrent data context accesses, and (1b) implicit conflicts, such as external service invocations. Sequentializing also includes, in general, (2) rearranging those process steps in an intent-preserving manner such that the conflict is resolved. This concept can include (2a) changing the order of process steps on a branch, and/or (2b) moving process steps out of (i.e., front of or behind) the parallel branches.

To facilitate the two general concepts described above, the process model may be augmented by dependency graph, which makes dependencies among process steps explicit. Each process step (activities, gateways, events) becomes a node in the dependency graph. Likewise, each internal and external resource that is referenced from those process steps also becomes a node in the dependency graph. An example dependency graph is described in FIG. 3.

FIG. 3 is an example dependency graph 300 of the example process model 200 shown in FIG. 2. Some process steps having no resource dependencies (AND split/merge) are omitted. In FIG. 3, the corresponding dependency graph 300 shows resource dependencies as ellipses and process step dependencies are shown as rectangles. For example, process steps "Start Event" 301, "Lookup Address" 302, "Enter Updated Address" 304, "ZIP Code Lookup" 308, "Send Letter" 310, "Update Address" 312, and End Event 328 are shown as rectangles. User ID data object 316 and Address data object 318 are shown as ellipses, and MDM system 326 is likewise shown as an ellipse. Directed edges connect process step nodes to resource nodes (and vice versa) to denote a dependency between the two artifacts. A directed node from (to) a process step node to (from) a resource node denotes an "updates" ("consumes") dependency between the two nodes, stating that the respective process step will alter (read) the state of the resource. Both dependencies to explicit and implicit resources are within the scope of the disclosure. For example, edge 320 indicates a write access to UserID data object 316 from "Start Event" 301. UserID data object 316 is an example of an explicit resource. In contrast, MDM system is an implicit resource (i.e., it does not appear as a self-contained entity in the process model but, rather, is derived from other attributes of the process steps).

Edge 322 shows a read access from UserID data object 316 from "Enter Updated Address" activity 304. Edge 324 indicates a two-way access (i.e., read/write). This sort of dependency does not relate to some control flow connectors in the process model. In FIG. 3, no two process steps nodes are directly connected. Resource nodes may be interconnected, denoting a hidden dependency between these resources. For instance, a role definition (e.g., potential owners of a user task) may be defined as an expression atop the process data context (i.e., a number of data objects). Updating the role happens automatically whenever the underlying data objects are altered (i.e., there is no process step explicitly doing so). Altogether, a directed edge from one resource node to another resource node indicates that when updating the former resource node, the latter resource node will be updated, as well. The dependency between resource nodes is transitive.

Depending on the type of process steps, there may be more external dependencies such as jointly used user interfaces or other "user exits" that may be used to access a shared state. In addition, the order of the predecessor and successor steps may be rearranged (ignoring any order of token flows), provided that no other conflicting dependency exists.

Algorithms may be applied to resolve conflicting accesses to shared resources. First, the process steps causing conflicting accesses can be identified. Generally, accesses from two (or more) process steps to a resource may be in conflict if:

(1) At least one of two accesses is a "write access" to the resource; and (2) The process steps performing the conflicting accesses reside on different process branches that run in parallel.

A "write access" includes an update or an alteration to data within the resource. Read-only accesses do not cause conflicts and may well happen in parallel. Whether the process step performs a write access can be verified by identifying conflicting accesses by (1) traversing each resource Ri; (2) identifying the set of process steps accessing that resource (e.g., $A(Ri) = \{P_1, P_2, P_3\}$); (3) grouping those process steps into distinct pairs (e.g., $P_1P_2, P_1P_3, P_2P_3$; and (4) excluding those pairs where both process steps merely read the resource.

The latter criterion (whether the process steps performing conflicting access reside on different process branches that run in parallel) checks if the two process steps that make up a pair actually may execute concurrently at runtime. Performing such a check statically (i.e., at compile time) does not necessarily yield an accurate result and may include false positives (pairs of process step which do not actually execute in parallel) and false negatives for non-block-structured processes. Inaccurate results from a static check may be due to BPMN artifacts, such as OR splits and a Complex Gateway's fork parallelism, which may depend on the state of the process, which is unknown at compile time. In certain instances, inaccuracies resulting from static, compile-time checks are acceptable engineering trade-offs. That is, the present disclosure contemplates resolving resource contentions, which improves performance and correctness characteristics, but contemplates a margin for error, the size of which is an engineering choice. One or more resource contentions may still remain unaddressed, while still achieving improved performance due to resolving other contentions. Similarly, certain contentions may be prioritized over others to achieve the highest desirable system performance improvement.

If for a pair of process steps PiPj, Pi can be reached from Pj by transitively following its inbound or outbound sequence connectors upstream or downstream, respectively, Pi and Pj can be considered to be happening in sequence. Otherwise the inbound sequence connectors of Pi and Pj are both traversed upstream until a joint XOR split is reached, upon which traversal is stopped and exclusive execution is assumed (i.e., no parallelism). In other instances, another joint predecessor step is reached, upon which traversal is stopped, and parallel execution is assumed.

The static, compile-time check mentioned is efficient to perform (takes linear time in the number of process steps), though it may yield inaccurate results. If appropriate, other (more expensive) graph analysis algorithms may be used that may yield fewer false positives/negatives. For instance, some advanced algorithms may be tuned to detect control flow cycles which may let two process steps run in parallel even if they are either sequential or have a joint XOR split predecessor. For the vast majority of correctly modeled processes, the algorithm described above can yield improved system performance, balancing system efficiency with false positives and false negatives.

After checking each pair of process steps for conflicting accesses to resources, and filtering out pairs of process steps that do not run in parallel, the remaining pairs of process steps can be categorized into two groups: those whose conflict resolution is trivial ("First Cases"), and those whose conflicts are more complex to resolve ("Second Cases"). In order to do so, the joint predecessor step (e.g., AND split or OR split, etc.) is considered, which was a prerequisite for assumed parallelism. Additionally, a joint successor step (e.g., AND join or OR join, etc.) can be identified, where the two branches are assumed to synchronize.

In a First Case, two conflicting process steps Pi and Pj on two parallel branches are initially arranged in a way that Pi or Pj is placed directly behind a joint predecessor step or directly in front of a joint successor step of Pi and Pj. That is, Pi or Pj is the first or last process step on its branch. Pi or Pj is the first process step behind the joint predecessor step on its respective branch, or Pi or Pj is the last process step in front of the joint successor step on its respective branch. For the Second Cases, both Pi and Pj have both other process steps between them and the joint predecessor and successor step.

Figure 4A:
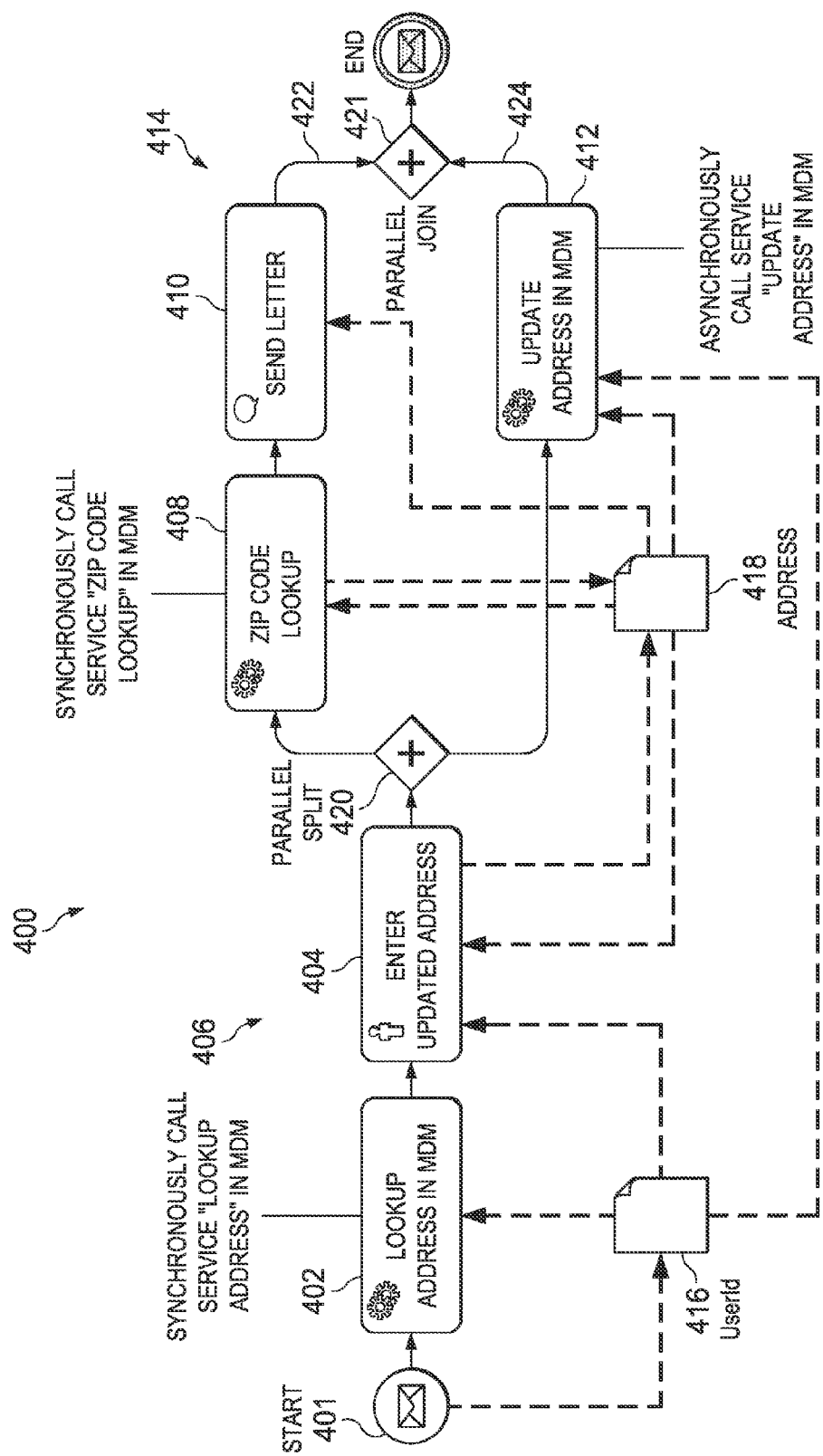
FIG. 4A is an example process model illustrating a First Case and an AND join predecessor step.

The First Cases can be resolved by pushing a conflicting process step in front of the joint predecessor step or behind the joint successor step. Differences arise from what artifact the joint predecessor or successor step is. For AND splits/joins, the conflicting process step can be placed directly in front of/behind the AND split/join. This is due to the fact that it is known that all outbound branches of an AND split to be activated when splitting the flow and all inbound branches required to be activated in order to trigger the AND join. In effect, the process step that is to be pushed from a parallel branch to in front of the AND split or to behind the AND join would be executed in either case—no matter where it resides. FIG. 4A is an example process model 400 illustrating a First Case and an AND join predecessor step. In FIG. 4A, activity "Zip Code Lookup" 408 conflicts with "Update Address in MDM" 412. "Zip Code Lookup" 408 is the first process step on its branch (directly behind the joint predecessor, parallel split 420), and "Update Address in MDM" 412 is both the first and the last process step on its branch (directly behind the joint predecessor 420 and directly in front of the joint successor, parallel join 421).

FIG. 4A shows the same example process as FIG. 2. Process model 400 includes five activities. At the start 401, a user ID may be initialized to access the user profile for sending mail. "Lookup Address in MDM" activity 402 reads from UserID data object 416 and performs a synchronous call to lookup the corresponding address in a master data management (MDM) system. The process model then permits the user to manually enter an updated address in the "Enter Updated Address" activity 404. The "Enter Updated Address" activity 404 performs a read from User ID data object 416 and from the Address data object 418. If the address is updated, the "Enter Updated Address" activity 404 performs a write access (or an update access) to the Address data object 418. "Lookup Address in MDM" activity 402 and "Enter Updated Address" activity 404 are shown to be performed in sequence (or in series) on a sequential branch of the process model. The parallel branches 414 are joined at a parallel join 421 (also referred to as an AND join 421). After the "Enter Updated Address" activity 404, the process splits into two parallel branches. The two parallel branches can be described as being part of a set of parallel branches 414. In this case, the set of parallel branches includes two parallel branches. In FIG. 4A, the sequential branch 406 forks into the set of parallel branches 414 by a parallel split 420, which is also referred to as "AND" split because process steps from both branches of the set of parallel branches 414 are executed. The "upper branch" 422 of the set of parallel branches 414 includes two process steps: "ZIP Code Lookup" 408 and "Send Letter" 410. The "lower branch" 424 includes one process step: "Update Address in MDM" 412. In this particular scenario, "ZIP Code Lookup" 408 is in conflict with "Update Address in MDM" 412 because the two process steps occur in parallel, the two process steps access the same resource, and at least one of the two process steps performs a write access on the resource (in this case, "Zip Code Lookup" 408 writes to the Address data object 418). Such a conflict can result in a resource contention.

As introduced above, the "ZIP Code Lookup" activity 408 of the upper branch 422 is in conflict with the "Update Address in MDM" activity 412 residing on the lower (parallel) branch 424. That is, both activities compete for accessing the "Address" data object 418 (internal resource) and the "MDM" system (external resource). FIG. 4A illustrates a so-called First Case because the conflicting activities are (1) the first process step ("ZIP Code Lookup" Activity) or (2) the first and last process step ("Update Address in MDM" activity) at the same time on their respective branches. For a First Case, it would even be sufficient if one of the two conflicting process steps is a first or last process step on its branch. This figure is an example of a First Case for three (redundant) reasons: First, one of the conflicting activities, "Zip Code Lookup" 408, is the first process step on the upper branch. Second, conflicting activity "Update Address in MDM" 412 is the first process step on the lower branch. And third, conflicting activity "Update Address in MDM" 412 is also the last process step on the lower branch.

FIG. 4B is an example process model 450 having a process construction that resolves the resource contention identified in FIG. 4A. A possible resolution for the conflict in FIG. 4A includes moving the "ZIP Code Lookup" activity 408 to a position in the process different from where it was so that it accesses the Address data object 418 at a different time—in this case, "ZIP Code Lookup" 408 is moved in front of the AND split 416. As such, activity "Update Address in MDM" 412 is executed after "ZIP Code Lookup" 408 was completed, and they no longer perform accesses to the shared resources (MDM system and Address data object) simultaneously. In FIG. 4B, sequential branch 407 includes three process steps: "Lookup Address in MDM" 402, "Enter Updated Address" 404, and "ZIP Code Lookup" 408. The set of parallel branches 415 still includes two parallel branches: an upper branch 423 and a lower branch 425. Upper branch 423 now includes the "Send Letter" activity 410; and the lower branch 425 includes the "Update Address in MDM" activity 412. Referring briefly to FIG. 4A, it can be seen that the resulting parallel steps ("Send Letter" activity 410 and "Update Address in MDM" activity 412) perform read access from Address data object 418, and thus, in the new set of parallel branches 415 shown in FIG. 4B, the parallel steps are no longer conflicting. Additionally, activity "Update Address in MDM" 412 is the only activity that accesses the MDM system.

FIG. 4C is an example process model 460 having a process construction that resolves the resource contention identified in FIG. 4A. FIG. 4C shows an alternative resolution of the resource contention in FIG. 4A. The process model 460 shown in FIG. 4C shows a transformed variant of the example process of FIG. 4A, where the "Update Address in MDM" activity 412 from the lower branch (shown in FIG. 4A) was pushed behind the AND join 421 shown in FIG. 4A. In effect, the lower branch has become empty such that the AND split and AND join gateways were removed altogether. Put differently, the process model 460 includes a sequence of process steps, including "Lookup Address in MDM" 402, "Enter Updated Address" 404, "ZIP Code Lookup" 408, "Send Letter" 410, and "Update Address in MDM" 412. The resolution variant of FIG. 4C resolves the resource contention, but, in turn, shows a less efficient utilization of computing resources than the resolution variant shown in FIG. 4B. This is due to the fact that all process steps are now sequentialized such that we never utilize more than one OS thread at a time. As a result, the resolution shown in FIG. 4C may take longer to complete than in FIG. 4B.

Figure 5A:
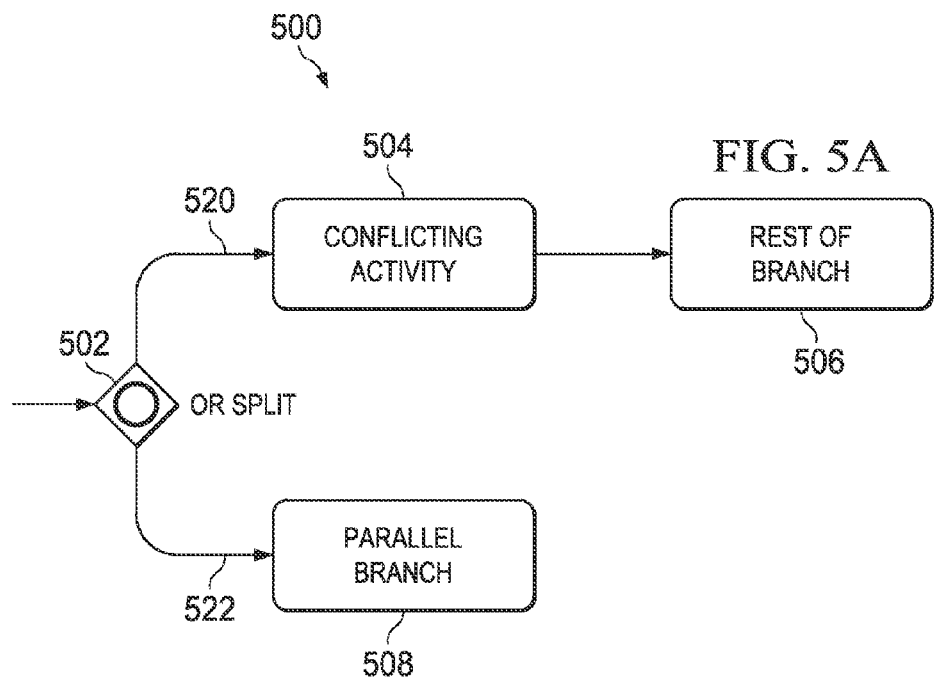
FIG. 5A is an example process model showing two parallel branches separated by an OR split.

FIG. 5A is an example process model 500 showing two parallel branches separated by an OR split 502. Though not shown, process model 500 may include a sequential branch prior to the OR split 502, and may include other process steps in each parallel branch after the ones depicted in FIG. 5A. For the sake of simplicity, FIG. 5A shows an arrow representing the entrance to the OR split 502. The process model 500 branches into an upper branch 520 and a lower branch 522. FIG. 5A shows two activities on the upper branch 520: the "Conflicting Activity" 504 and the "Rest of Branch" 506, which represents all other process steps occurring after the "Conflicting Activity" 504. On the lower branch 522, there is the activity "Parallel Branch" 508. "Parallel Branch" 508 can be considered a single activity on lower branch 522 that is executed in parallel with "Conflicting Activity" 504, the two steps in contention for the same resource.

Figure 5B:
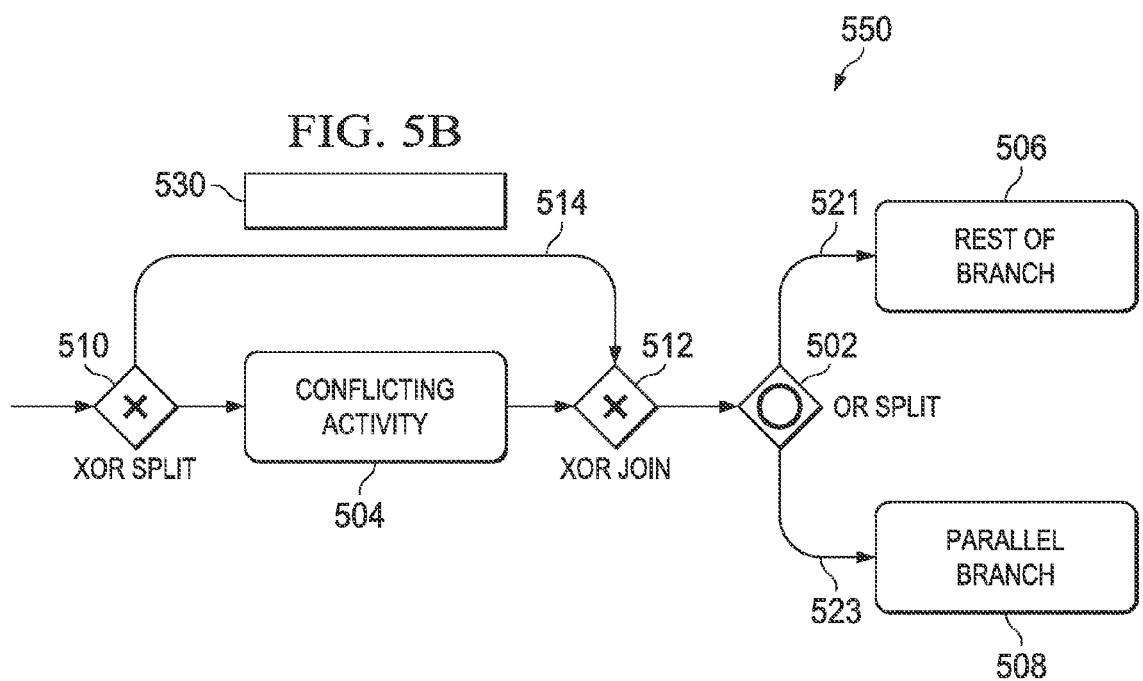
FIG. 5B is an example process model showing an XOR split and XOR join in front of the parallel branches.

For OR splits and Complex Gateways, pushing the conflicting process step in front of the gateway would alter the execution semantics in a way such that the activation condition for the corresponding branch may not be evaluated before executing the conflicting process step at runtime. FIG. 5B is an example process model 550 showing an XOR split 510 and XOR join 512 (formally, "Exclusive Split Gateway" 510 and "Exclusive Merge Gateway," 512 respectively) in front of the parallel branches. The "Conflicting Activity" 504 is moved from the upper branch 520 of FIG. 5A to the sequential branch 514 preceding the parallel branches (as shown in FIG. 5B). Process 550 includes an XOR sequential branch 514 and a set of parallel branches, including an upper branch 521 that includes "Rest of Branch" 506 and a lower branch 523 that includes "Parallel Branch" 508. The XOR split 510 in front of the relocated "Conflicting Activity" 504 facilitates triggering that step only when its original branch 521 is activated. Inserting an extra XOR split may cost extra CPU cycles and time, but may be (partially) compensated for by caching the outcome of the XOR split's evaluation (i.e., the original branch condition) in some buffer data object 530. The upstream XOR split checks the same condition as the upper branch 521 of the OR split 502. To avoid potential race conditions, the outcome of the XOR split 510 may be buffered in a dedicated data object 530 and later reused in the OR split.

Figure 6A:
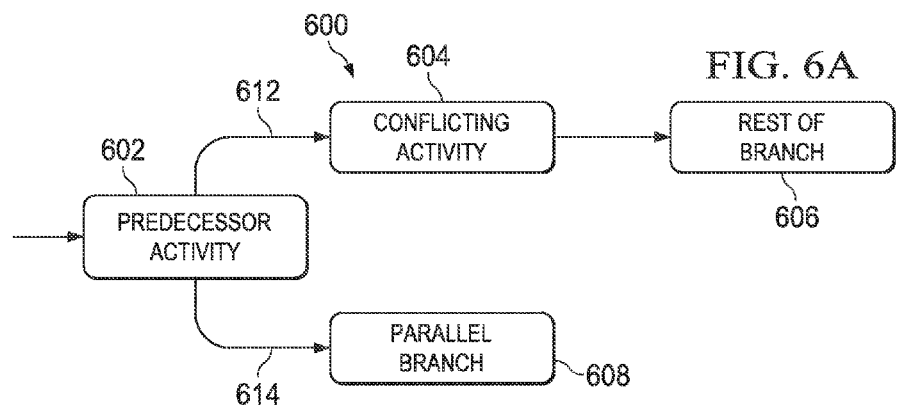
FIG. 6A is an example process model showing "Predecessor Activity" as the joint predecessor of a set of parallel branches.

In certain instances, the joint predecessor process step of two branches carrying mutually conflicting process steps may be an activity or a process step. FIG. 6A is an example process model 600 showing "Predecessor Activity" 602 as the joint predecessor of a set of parallel branches. When the joint predecessor is not a gateway, but another process step (e.g., activities, events, etc.), an implicit AND-split semantics may apply. That is, a predecessor step having multiple outbound branches is semantically equivalent to a predecessor having a single outbound edge that points to an AND split which forks the parallel branches. In effect, the treatment for AND splits may apply, and the conflicting process step may be relocated to a place in between the original predecessor step and the (now separated) AND split behind. In FIG. 6A, "Predecessor Activity 602 is a predecessor activity prior to parallel branches of the process 600. The upper branch 612 includes the "Conflicting Activity" 604 and the "Rest of Branch" 606. The lower branch 614 includes "Parallel Branch" 608, which is in contention for a resource with "Conflicting Activity" 604.

Figure 6B:
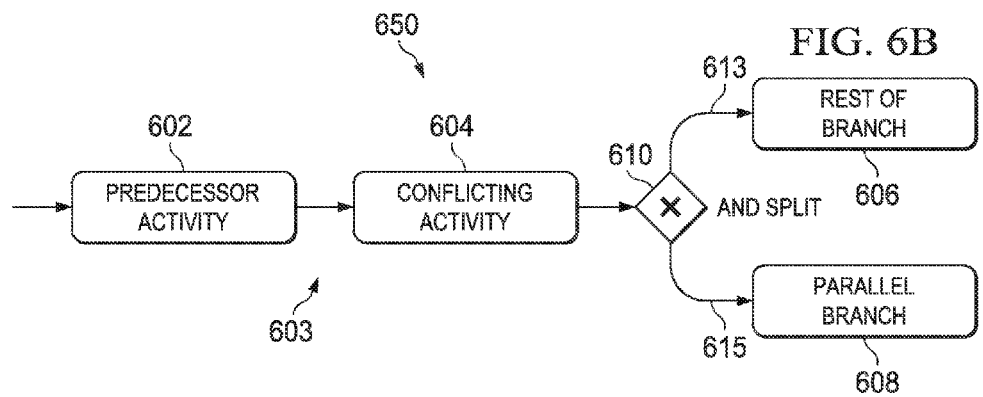
FIG. 6B is an example process model in which "Conflicting Activity" is moved to a position in series and after "Predecessor Activity."
Figure 6C:
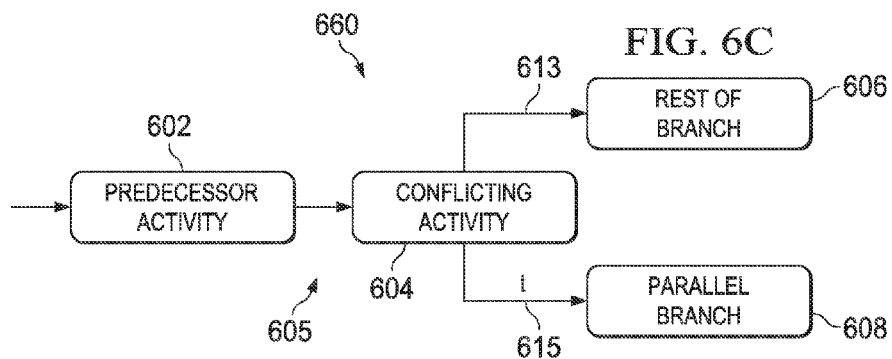
FIG. 6C is an example process model in which "Conflicting Activity" is the joint predecessor of the parallel branches.

The conflict can resolved as shown in FIG. 6B. FIG. 6B is an example process model 650 in which "Conflicting Activity" 604 is moved to a position in series and after "Predecessor Activity" 602. The "Conflicting Activity" 604 is moved out of the upper branch 612 (of FIG. 6A), and a new sequential branch 603 is defined that includes the "Predecessor Activity" 602 and the "Conflicting Activity" 604 (though, it is no longer conflicting). The upper branch 613 now includes "Rest of Branch" 606, and the lower branch 615 includes "Parallel Branch" 608. An AND split 610 may be added as the joint predecessor to the parallel branches. "Conflicting Activity" 604, however, can directly fork the two branches. In other words, "Conflicting Activity" 604 can be the joint predecessor to the parallel branches 613 and 615. FIG. 6C is an example process model 660 in which "Conflicting Activity" 604 is the joint predecessor of the parallel branches. In FIG. 6C, the sequential branch 605 includes the "Predecessor Activity" 602. "Conflicting Activity" 604 is also in the sequential branch 605. Sequential branch 615 does not include an AND split. Instead, parallel branches 613 (that includes "Rest of Branch 606) and 615 (that includes "Parallel Branch" 608) branch directly from "Conflicting Activity" 604.

FIG. 7 is a process 700 showing an example Second Case process model. In a Second Case, the conflicting process step(s) resides somewhere "in the middle" of a parallel branch, (e.g., behind the first and in front of the last process step of that branch for a three step branch). FIG. 7 illustrates the Second Case. Process 700 includes a starting point 702. Though shown to proceed directly to the parallel branches, there may be one or more process steps between the starting point and the parallel branches. In this example, the process 700 includes an AND split 704, and two parallel branches— an upper branch 720 and a lower branch 722. The upper branch 720 includes "Leading Process Steps (Upper Branch)" 706, "Conflicting Process Steps (Upper Branch)" 708, and "Trailing Process Steps (Upper Branch)" 710. The lower branch 722 includes "Leading Process Steps (Lower Branch)" 712, "Conflicting Process Steps (Lower Branch)" 714, and "Trailing Process Steps (Lower Branch)" 716. The parallel branches are joined by an AND join 718.

The conflicting process step cannot immediately be pushed in front of or behind the parallel branches. Techniques for resolving conflicting resource access include swapping process steps (under consideration of the dependency graph (see FIG. 3)), by which the Second Case can be transformed into a First Case, which is handled as shown above. If transformation into a First Case is not feasible, however, a variant of the milestone pattern can be used to enforce synchronizing conflicting process steps even though they reside on parallel branches.

Process model 700 above illustrates a Second Case in which the conflicting process steps reside in the middle of their parallel branches. Transforming a Second Case into a First Case is an approach that both does not increase the number of artifacts (process steps) in the resulting process model (by changing the order of process steps before handling the resulting Second Case) and does not introduce any extra synchronization between the parallel branches. Feasibility is constrained by dependencies between the conflicting process step(s) and the process step(s) that are exchanged against on their branches. In the example process, transformation of the scenario where the "Conflicting Process Step (Upper Branch)" 708 is in conflict with "Conflicting Process Step (Lower Branch)" 714 could happen by any of:

1. Moving the conflicting process step on the upper branch into the first position on its branch by successively swapping its position against process steps in the "Leading Process Steps (upper branch)" 706 block;
2. Moving the conflicting process step on the upper branch into the last position of the upper branch by successively swapping its position against process steps in the "Trailing process steps (upper branch)" 710 block;
3. Moving the conflicting process step on the lower branch into the first position on its branch by successively swapping its position against process steps in the "Leading Process Steps (lower branch)" 712 block; or
4. Moving the conflicting process step on the upper branch into the last position of the lower branch by successively swapping its position against process steps in the "Trailing process steps (lower branch)" 716 block;

It may be sufficient for one of the aforementioned operations to be feasible in order to successfully transform the Second conflicting Case into a First Case.

FIG. 8A is a process 800 showing an example abstraction of the Second Case process model. Process 800 includes a starting point 802 prior to the AND split 804 (though not shown, there may be one or more process steps between start 802 and the AND split 804). The set of parallel branches includes an upper branch 826 and a lower branch 828. The upper branch 826 includes three process steps: A 806, B 808, and C 810. The lower branch 828 includes three process steps: D 812, E 814, and F 816. In process 800, process step B 808 is in conflict with process steps E 814 and F 816 for resource R2 822. Process steps A 806 and D 812 read from data object R1 820 in parallel, and process steps C 810 and F 816 read from data object R3 824 in parallel. Parallel read access, however, does not result in resource contentions. Thus, the contention here results from the write accesses to data object R2 822 from process steps B 808, E 814, and F 816. The parallel branches are joined by an AND join 818.

Swapping a sequence of activities A→B into B→A (i.e., moving A right and B left) may be constrained by the mutual dependencies between A and B. As both A and B are process steps that access different resources (R1 820 and R2 822, respectively), no direct dependencies exist. Therefore, we define an "interacts with" relation as follows: activity A interacts with another activity B if, and only if: (a) there is some resource R that is updated by B (i.e., B "writes to R"), and (b) there is a resource R', which is identical to R, or R' is transitively dependent from R, and A reads from or writes to R'.

Put differently, an activity A interacting with another activity B denotes that A is in some way affected by the effects of B on a shared resource. Having both A and B read a shared resource does not denote an interaction in that sense. Conversely, if B writes to a resource (say, some data object), and A reads that resource, A interacts with B (in other words, A depends on B in a sense that A consumes the effects of B materialized in the shared resource). Due to the fact that (1) updating a resource often entails reading the resource beforehand, and (2) to avoid "lost update" phenomena, A also interacts with B if A updates (writes to) the shared resource that is also updated by B, the "interacts with" relationship also applies to transitive resource relationships. For instance, B might be updating some data object while A reads from some role definition that is defined as a dependent view atop the data object. Altering the data object may propagate to the role through its view definition such that A may be reading the effects of B.

Returning to the concept of swapping a predecessor activity A against another activity B, the sequence A→B can be altered into B→A if, and only if, neither A interacts with B nor B interacts with A. In other words, none of the two process steps has effects that may alter the effects of the other activity.

FIG. 8B is a process 850 showing an example Second Case process model in which conflicting accesses are resolved by swapping activity sequences. The parallel split 804 (i.e., AND split 804) occurs after the start 802, and the parallel branches are joined with a parallel join 818 (i.e., AND join 818). As compared to FIG. 8A, in FIG. 8B, activity A 806 has switched position with activity B 808. Upper branch 825 still includes activities A 806, B 808, and C 810, but in the following order: B 808, A 806, and C 810. Lower branch 826 remains unchanged, and still includes activities D 812, E 814, and F 816. The accesses to resources R1 820, R2 822, and R3 824 by the respective activities also remain unchanged, with the exception of the order in which the resources are accessed by processes A 806 and B 808.

The complex conflicting scenario shown in FIG. 8A (activity B 808 from upper branch 825 competes with activities E 814 and F 816 on lower branch 826 on accessing the data object R2 822) can be resolved by transforming it into a First Case. Activity A 806 can be swapped with activity B 808 because neither A 806 interacts with B 808; nor does B 808 interact with A 806. The two activities A 806 and B 808 access different resources, such that their order does not matter. After doing so, B 808 is the first activity on the upper branch 825, as shown in FIG. 8B.

Figure 8C:
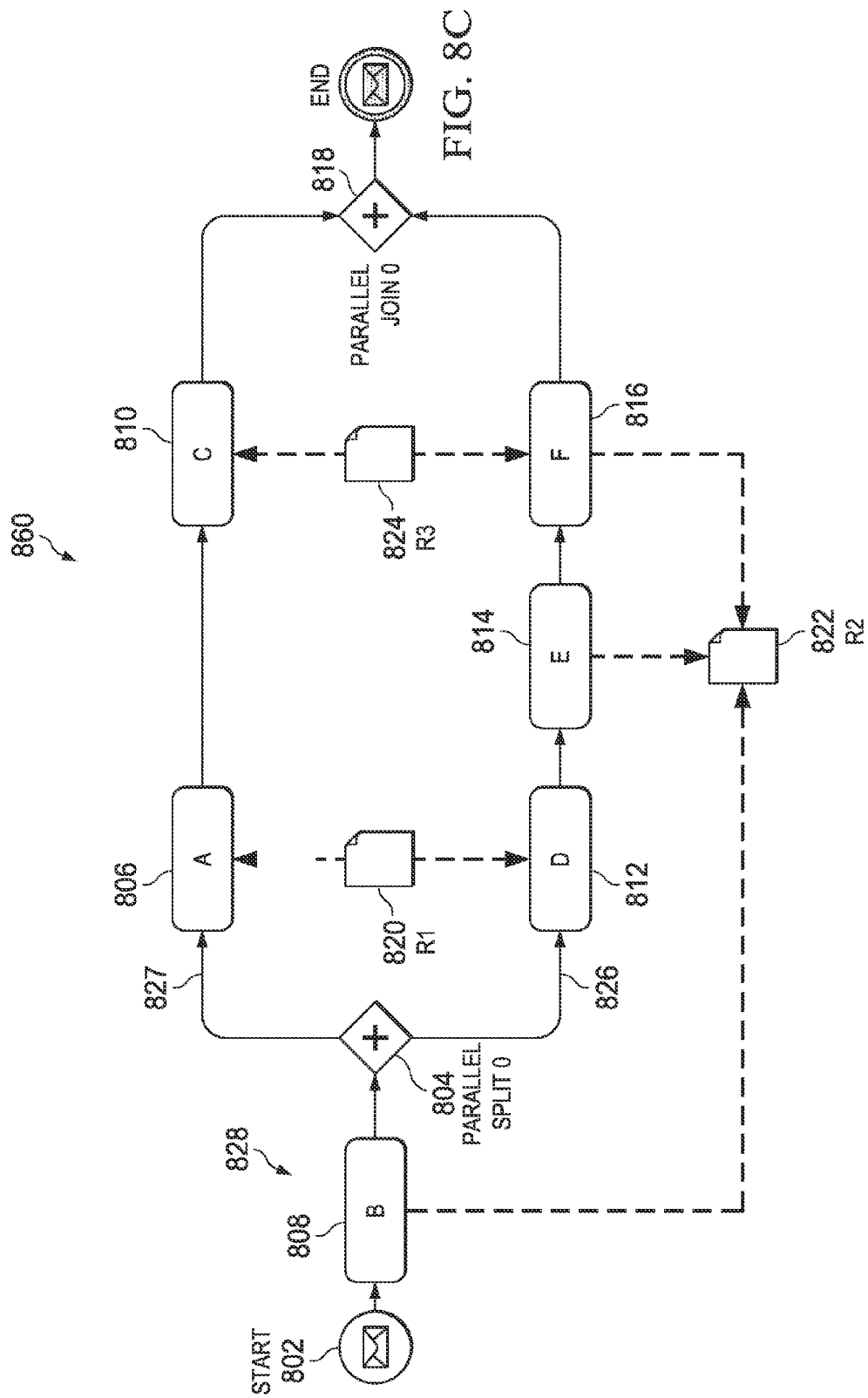
FIG. 8C is an example process resulting from transforming a Second Case into a First Case to resolve conflicting accesses to a shared resource.

After swapping the positions of activities A 806 and B 808, the transformation rules of the First Case can be applied. Specifically, activity B 808 can be moved in front of the AND split 804 to ultimately resolve the conflict. FIG. 8C is an example process 860 resulting from transforming a Second Case into a First Case to resolve conflicting accesses to a shared resource. In process 860, activity B 808 is moved to a sequential branch 828, and is shown to be between the start 802 and the AND split 804. AND join 818 joins the upper branch 827 with lower branch 826. Activity B 808 write-accesses resource R2 822 prior to the start of the parallel branches, and thus, the write access does not conflict with either E 814 or F 816. Upper branch 827 now includes activities A 806 (read-accessing R1 820) and C 810 (read-accessing R3 824). Lower branch 826 remains unchanged. Activity D 812 read accesses R1 820; activity E 814 write accesses resource R2 822, and activity F 816 write accesses R2 822 and read accesses R3 824. Activity E 814 is not in conflict with activity F 816 for access to R2 822 because activities E 814 and F 816 are performed in series.

Figure 9A:
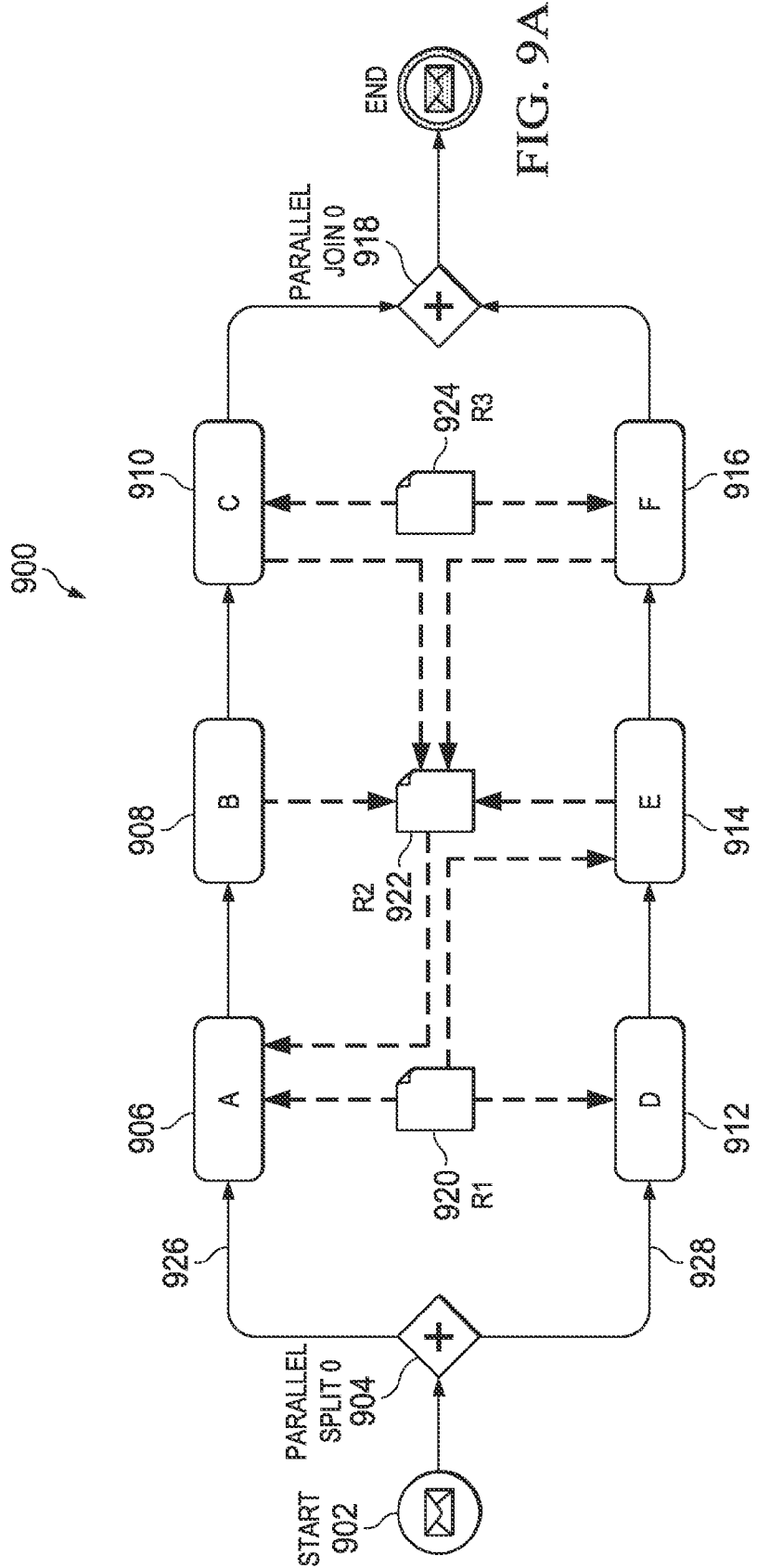
FIG. 9A is an example process model in which process steps interact.

Transforming a Second Case into one of the First Cases may not always be feasible because the "interacts with" relationship may inhibit swapping the position of the conflicting activity with another step on the branch. FIG. 9A is an example process model 900 in which activities interact. Process 900 includes an AND split 904 after the start 902. Process 900 includes two parallel branches joined by an AND join 918. The upper branch 926 includes activities A 906, B 908, and C 910. The lower branch 928 includes activities D 912, E 914, and F 916. Activities A 906, D 912, and E 914 read from resource R1 920. Activity A 906 reads from resource R2 922; activities B 908, C 910, E 914, and F 916 write to resource R2 922. Activities C 910 and F 916 read from resource R3 924. In process 900, activity A 906 interacts with B 908 because A 906 reads R2 922, which is updated by B 908. Activity B 908 interacts with C 910 because process B 908 updates R2 922, which is also updated by C 910. Similarly, activity E 914 interacts with F 916 because E 914 and F 916 write to R2 922. In effect, neither B nor E (a conflicting pair of activities) can be moved away from their positions on their respective branches.

Techniques for resolving access conflicts for the situation described above in connection with FIG. 9A may include combining a "milestone" and a "critical section" workflow pattern. Resource contentions that may have the effect of accessing shared resources are primarily addressed. That is, conflicting activities may remain on their respective (parallel) branches, provided that they are not actually attempted to be executed simultaneously. Thus, a synchronization mechanism can be introduced across branches that serializes accessing process steps on different branches.

Figure 9B:
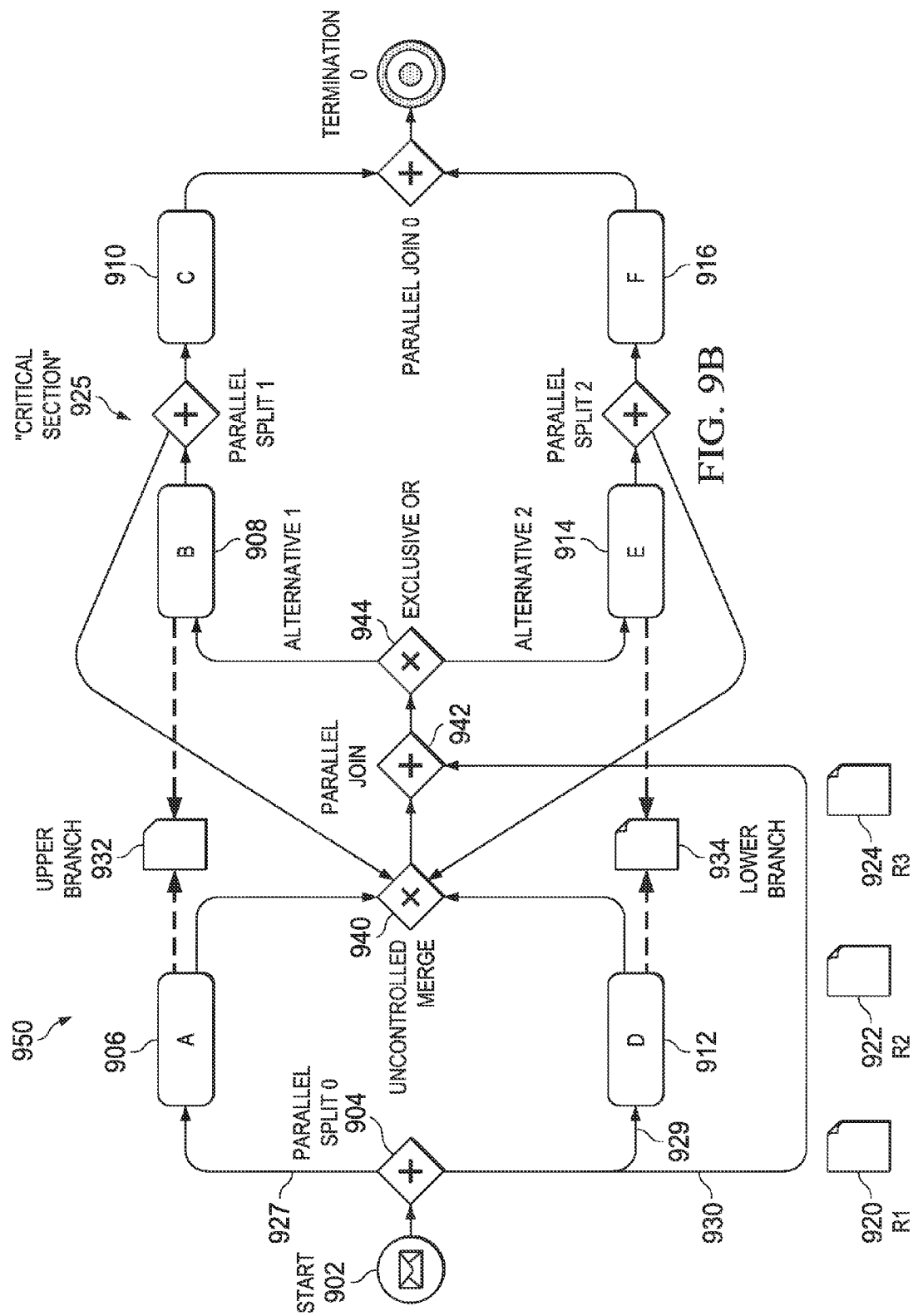
FIG. 9B is an example process model that includes a critical section for synchronizing parallel process steps.

BPMN does not natively support certain synchronization approaches (e.g., milestone and critical section patterns), and so such approaches are modeled using existing artifacts, such as AND splits and joins. FIG. 9B is an example process model 950 that includes a critical section 925 for synchronizing parallel activities. The process model 950 shown in FIG. 9B illustrates how the execution of activities B 908 and E 914 can be synchronized by introducing a "critical section" 925 pattern around those two process steps. Process model 950 begins at 902 and proceeds to an AND split 904. In addition to the parallel branches (including first upper branch 927 and first lower branch 929), a third branch 930 is initially forked from the initial AND split 904. A token from that branch 930 is merged with a token representative of the completed activities A 906 or D 912 (i.e., the process is ready to execute B or E on the upper or lower branch, respectively) at Parallel Join 942. The branch that is entering the critical section 925 is recorded in the Boolean data objects "upperBranch" 932 and "lowerBranch" 934, which are set to "true" in the predecessor activities (A and D). The parallel branches 927 and 929 are combined at uncontrolled merge 940.

Inside the critical section 925, the branch to be executed is identified, and either runs B 908 or E 914, respectively, based on the identification (the Exclusive OR (XOR), split 944 facilitates the conditional pathway for process step execution, which is based on the tokens received at parallel join 942). The identification can be based on a state following the completion of activity A 906 and/or D 912 using the "upperBranch" 932 and "lowerBranch" 934 data objects. A token is passed back to the start of the critical section 925 and the rest of the current branch is continued. Thus, a token from the opposite branch can enter the critical section 925 by synchronizing the passed-back token with the token from the upstream part of the branch. Activities C 910 and F 916 can be executed after the process steps in the critical section 925 are executed.

Using a mixture of the "critical section" and "milestone" workflow patterns for this sort of cross-branch synchronization considers how to structure the process. For one, the "active" branch is recorded in a separate data object (in FIG. 9B, in either "upperBranch" 932 or "lowerBranch" 934) to avoid that concurrent process step's "race" on accessing a single data object for that purpose. Second, a Terminating End Event can be used to complete the (sub-) process in which the pattern is used, thus enabling that any pass-back tokens are cleaned up when the process terminates.

Cross-branch synchronization both obfuscates and (to some extent) inflates the process model with additional artifacts. Namely, additional artifacts include additional data objects (to store the branch activation status), one or more additional AND-splits (to pass back a token) for each process branch, and one or more additional AND-splits, XOR splits, and XOR merges, globally. Obfuscation, however, can be reduced by "outsourcing" the affected process fragments into sub-processes. The overhead of additional artifacts may well be acceptable in the light of resource contentions that can be avoided in this manner. In particular, gateways (which make up for the largest part of the synchronization pattern) have a minimal runtime overhead. The extra data objects for storing the branch activation (and the corresponding data mappings which set/unset those data objects) can be avoided at the expense of introducing another AND split/AND join pair per branch plus a "global" AND split which replaces the XOR split as shown in FIG. 9C.

Figure 9C:
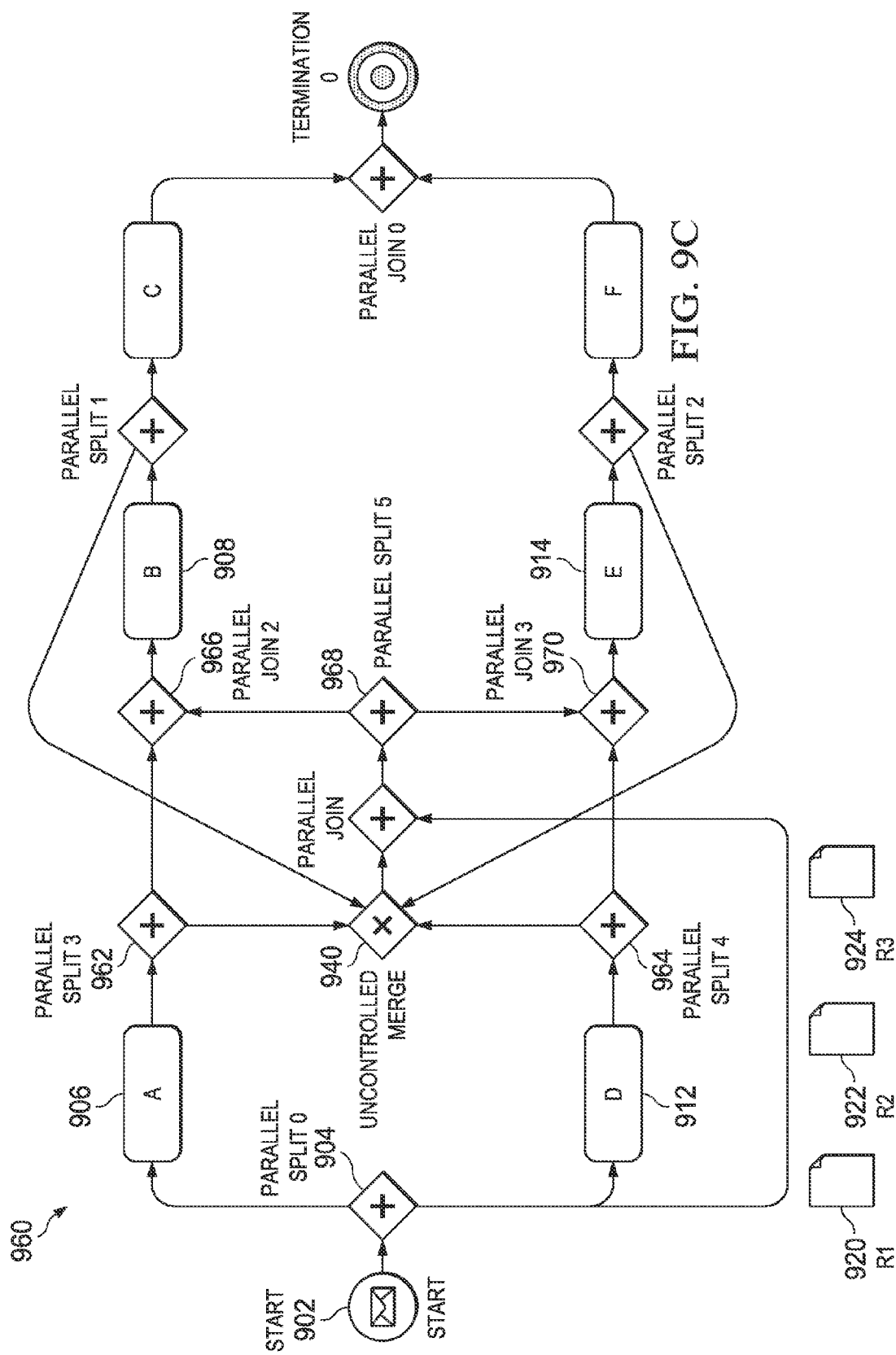
FIG. 9C is an example process flow that includes a critical section for cross-branch synchronization.

FIG. 9C is an example process flow 960 that includes a critical section for cross-branch synchronization. The variant of cross-branch synchronization shown in FIG. 9C does away with using the data flow (i.e., extra data objects plus branching in XOR split) to "record" and evaluate the branch activation status. Instead, the active branch will preserve its activation status in an extra token that is forked in an extra AND split after activities A 906 and D 912, respectively (i.e., AND split 962 and 964, respectively). That token is synchronized to the branch that is to be executed in a successive AND join before activities B 908 and E 914, respectively (i.e., AND join 966 and 970, respectively). The second token from that AND join either originates from the initial AND split start of the parallel block or is a "pass back" token from after executing B 908 or E 914, respectively. Which of the two implementations of FIGS. 9B and 9C is chosen depends on the runtime cost of either using AND splits/joins or data objects/XOR splits.

Sequentializing resource contentions helps to reduce the occurrence of resource contentions that arise from concurrent accesses to shared resources. In effect, fair progress inside process instances (among different branches) also benefits from avoiding recurrent rollback/retry cycles of process steps that fail due to resource conflicts. Similarly, process turn-around times may be reduced by fewer occasions where process steps need to wait for blocked resources.

Figure 10:
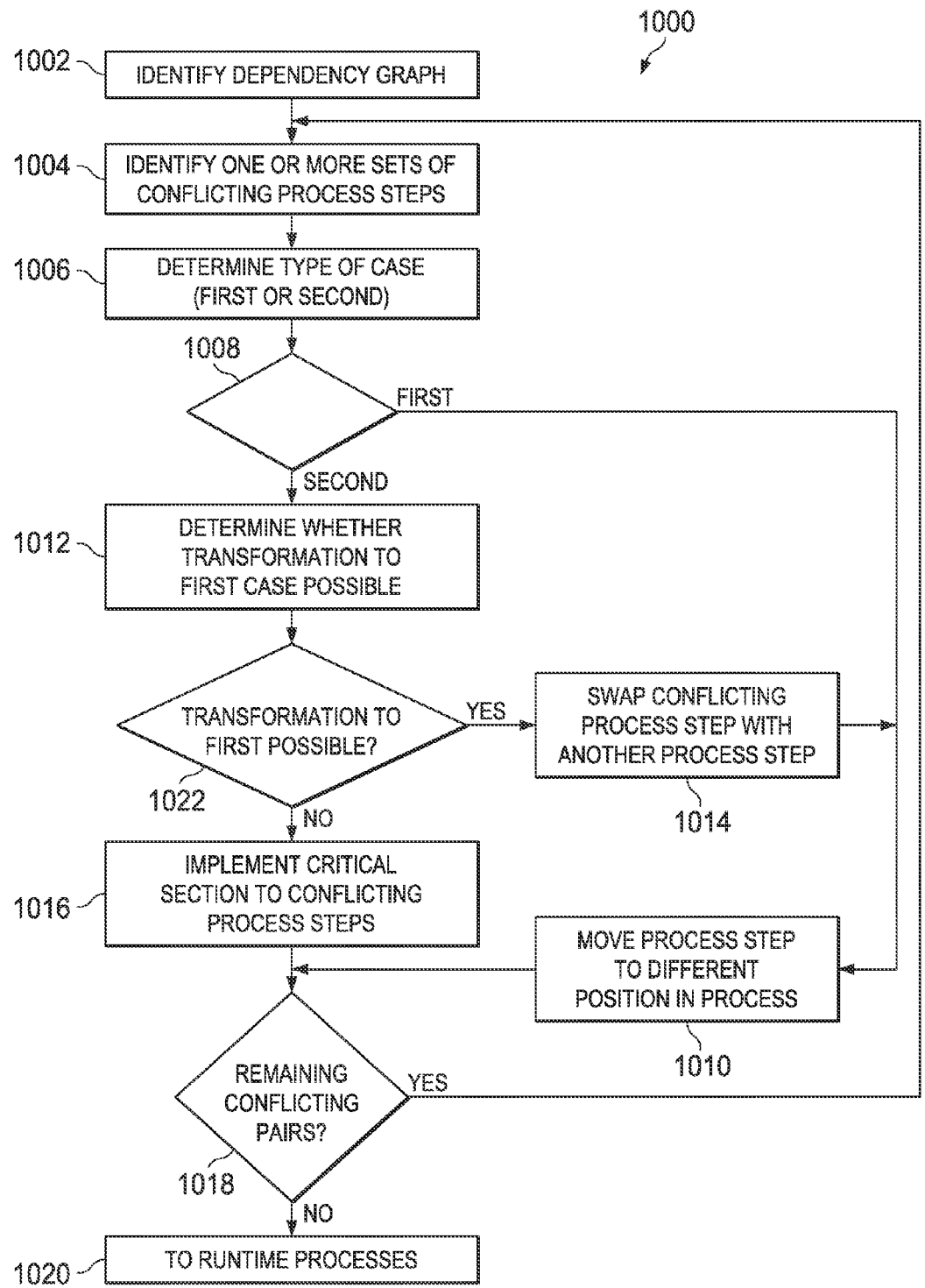
FIG. 10 is a process flow chart for resolving resource contentions in a First Case.

FIG. 10 is a process flow chart 1000 for resolving resource contentions in a First Case. A dependency graph for a process model can be identified at 1002. The dependency graph can be identified by graphically mapping the relationships between process steps and associated resources. One or more conflicting accesses to resources by corresponding process steps are identified in parallel at 1004. The type of case can be identified at 1006. Specifically, whether the conflict is a First Case or a Second Case can be identified 1008. If the conflict is a First Case, one of the conflicting process steps can be moved to a different position 1010 (specifically, in front of a joint predecessor or behind a joint successor process step for parallel branches). Moving the conflicting process step to a different position can include moving it to a location outside of the parallel branches, such as to a sequential branch or a different parallel branch that is not parallel to the conflicting process step's original branch. Also, the conflicting process step can be moved to a position either before the parallel branch or after it, depending on the process step, the access functionality, and the other steps in the parallel branches. If the case is a Second Case, whether the Second Case can be transformed into a First Case can be identified based, at least in part on, whether the conflicting process step(s) interact with other process steps 1012. For conflicts that can be transformed into a First Case, the conflicting process step can be moved to a different position on its corresponding branch 1014. The conflicting process step can then be moved to a position outside of the parallel branches 1010. If the transformation to a First Case is not possible (because a conflicting process step interacts with another process step), a critical section can be implemented 1016. The conflicting process steps can be synchronized at runtime. A determination can be made as to whether there are more conflicting activities 1018. If there are, then the process can revert to identify the conflict(s) 1004. If there are no further conflicts (or there are no further conflicts of which a resolution is desired), then the process can continue to runtime or other pre-runtime processes 1020.

FIG. 11 is a process flow chart 1100 for identifying conflicting resource accesses by process steps executed in parallel. Each resource $R_i$ is traversed at 1102. The set of process steps accessing that resource is identified at 1104. For example, the set $A(R_1) = \{P_1, P_2, P_3\}$. The processes in the set (e.g., $A(R_i)$) can be grouped into distinct pairs (e.g., $P_1P_2$, $P_1P_3$, $P_2P_3$) at 1106. Pairs whose accesses are read accesses can be excluded 1108. Conflicting pairs of process steps that are executed in series (or sequentially) can also be excluded 1110. The resulting set of process steps are conflicting to the extent that they are attempted to be executed in parallel at runtime.

A number of embodiments have been described. Nevertheless, it will be understood that various modifications may be made without departing from the spirit and scope of the disclosure. Accordingly, other embodiments are within the scope of the following claims.

What is claimed is:

1. A computer implemented method for managing access to a shared resource of a process, the method comprising:
   identifying, during runtime, a plurality of process steps of the process that are executed in parallel, each process step of the plurality of process steps accessing, when executed a shared resource at the same time resulting in a conflicting resource access, wherein the plurality of process steps include a first conflicting process step performed on a corresponding first parallel branch of the process and a second conflicting process step performed on a corresponding second parallel branch of the process, wherein, for each conflicting process step, there is, on each corresponding process branch, at least one previous process step and at least one subsequent process step;

identifying a first value for the previous process step after completion of the previous process step on the first parallel branch of the parallel branches of the process;

storing the first value in a first data object;

identifying a second value for the previous process step after completion of the previous process step on the second parallel branch of the parallel branches of the process;

storing the second value in a second data object; and resolving the conflicting resource access by rearranging at least one of the process steps of the plurality of process steps to access the shared resource by executing one of the first or second conflicting process steps based on a comparison of the first value and the second value in the first and the second data object, respectively.

2. The method of claim 1, wherein at least one of the process steps of the plurality of process steps performs a write access to the shared resource.

3. The method of claim 1, wherein the at least one of process steps of the plurality of process steps performs an update to the shared resource.

4. The method of claim 1, wherein the position outside of the parallel branches of the process is a position prior to the start of the parallel branches of the process.

5. The method of claim 1, wherein rearranging at least one of the process steps to access the shared resource at the different time includes changing an order of process steps of at least one of the branches of the parallel branches of the process.

6. The method of claim 1, further comprising generating a dependency graph relating one or more shared resources used during the process and the plurality of process steps, wherein the shared resources and each process step of the plurality process steps are nodes of the dependency graph, and wherein each edge of the dependency graph represents an access of the resource by the process step.

7. The method of claim 6, further comprising identifying, based on the dependency graph, one or more conflicting accesses to the shared resource from two or more process steps.

8. The method of claim 7, wherein the one or more conflicting accesses to the shared resource includes at least one write access to the resource.

9. The method of claim 7, wherein the two or more process steps are executed on parallel branches of the process concurrently.

10. The method of claim 7, wherein identifying the one or more conflicting accesses comprises:
identifying the resource in the dependency graph;
identifying the plurality of process steps that access the shared resource;
grouping the plurality of process steps into distinct pairs;
identifying pairs of process steps wherein both accesses to the shared resource by the process steps are read accesses; and
excluding the pairs of process steps wherein both accesses to the shared resource by the process steps are read accesses.

11. The method of claim 10, further comprising excluding pairs of process steps that are identified to execute sequentially.

12. The method of claim 1, wherein the shared resource is one or both of:
an explicit resource that is intrinsic to the process, or
an implicit resource that is extrinsic to the process.

13. The method of claim 1, wherein rearranging the at least one of the process steps of the plurality of process steps to access the shared resource at the different time includes transforming the corresponding parallel branches into sequential branches.

14. The method of claim 1, wherein rearranging the at least one of the process steps to access the shared resource includes moving the at least process step to a position outside of the corresponding parallel branch of the process.

15. The method of claim 1, further comprising:
creating a new process model defining the rearranged process steps of the plurality of process steps; and
storing the new process model.

16. A system for resolving conflicting resource accesses by process steps in a process, the system comprising:
a memory for storing instructions; and
at least one processor configured to execute the instructions stored on the memory, the instructions when executed perform operations comprising:
identifying, during runtime, a plurality of process steps that are executed in parallel, each process step of the plurality of process steps accessing, when executed, a shared resource at the same time resulting in a conflicting resource access, wherein the plurality of process steps include a first conflicting process step performed on a corresponding first parallel branch of the process and a second conflicting process step performed on a corresponding second parallel branch of the process, wherein, for each conflicting process step, there is, on each corresponding process branch, at least one previous process step and at least one subsequent process step;
identifying a first value for the previous process step after completion of the previous process step on the first parallel branch of the parallel branches of the process;
storing the first value in a first data object,
identifying a second value for the previous process step after completion of the previous process on the second parallel branch of the parallel branches of the process;
storing the second value in a second data object; and
resolving the conflicting resource access by rearranging at least one of the process steps of the plurality of process steps to access the shared resource by executing one of the first or second conflicting process steps based on a comparison of the first value and the second value in the first and the second data object, respectively.

17. The system of claim 16, the instructions further operable when executed to:
generate a dependency graph relating one or more shared resources used during the process and the plurality of process steps, wherein the shared resources and each process step of the plurality process steps are nodes of the dependency graph, and wherein each edge of the dependency graph represents an access of the shared resource by the process step.

18. The system of claim 17, wherein the instructions are further operable to:
identify the shared resource in the dependency graph;

identify the plurality of process steps that access the resource;

group the plurality of process steps into distinct pairs; and exclude pairs of process steps wherein both accesses to the shared resource by the process steps are read accesses.

19. The system of claim 18, wherein the instructions are further operable to exclude pairs of process steps that are identified to execute sequentially.

20. The system of claim 16, the operations further comprising:

creating a new process model defining the rearranged process steps of the plurality of process steps; and storing the new process model.

21. A computer program product stored on a tangible, non-transitory media, the computer program product executable by at least one processor for resolving conflicting resource accesses by process steps in a process by performing operations comprising:

identifying, during runtime, a plurality of process steps of the process that are executed in parallel, each process step of the plurality of process steps accessing, when executed, a shared resource at the same time resulting in a conflicting resource access, wherein the plurality of process steps include a first conflicting process step performed on a corresponding first parallel branch of the process and a second conflicting process step performed on a corresponding second parallel branch of the process, wherein, for each conflicting process step, there is, on each corresponding process branch, at least one previous process step and at least one subsequent process step;

identifying a first value for the previous process step after completion of the previous process step on the first parallel branch of the parallel branches of the process;

storing the first value in a first data object;

identifying a second value for the previous process step after completion of the previous process step on the second parallel branch of the parallel branches of the process;

storing the second value in a second data object; and resolving the conflicting resource access by rearranging at least one of the process steps of the plurality of process steps to access the shared resource by executing one of the first or second conflicting process steps based on a comparison of the first value and the second value in the first and the second data object, respectively.

22. The computer program product of claim 21, further operable to:

identify a shared resource in a dependency graph;

identify process steps that access the shared resource;

group the identified process steps into distinct pairs; and exclude pairs of process steps wherein both accesses to the shared resource by the process steps are read accesses.

23. The computer program product of claim 22, further operable when executed to exclude pairs of process steps that are identified to execute sequentially.

24. The computer program product of claim 21, the operations further comprising:

creating a new process model defining the rearranged process steps of the plurality of process steps; and storing the new process model.

* * * * *